United States Patent [19]
Webb et al.

[11] 3,797,233
[45] Mar. 19, 1974

[54] INTEGRATED CONTROL FOR A TURBOPROPULSION SYSTEM

[75] Inventors: William L. Webb, Lake Park; Thomas R. Warwick, Jupiter; Ronald D. Hackey, Palm Beach Garden; Robert L. Price, Tequesta, all of Fla.

[73] Assignee: United Aircraft Corporation, East Hartford, Conn.

[22] Filed: June 28, 1973

[21] Appl. No.: 374,611

Related U.S. Application Data

[63] Continuation of Ser. No. 138,163, April 28, 1971.

[52] U.S. Cl. ...... 60/39.16 R, 60/39.28 R, 60/226 R, 60/236, 60/238, 60/239, 60/240
[51] Int. Cl. ............................. F02c 9/04, F02c 3/06
[58] Field of Search .. 60/39.28 T, 39.28 R, 39.16 R

[56] References Cited
UNITED STATES PATENTS

| | | | |
|---|---|---|---|
| 3,520,133 | 7/1970 | Loft et al. | 60/39.28 R X |
| 3,606,754 | 9/1971 | White | 60/39.28 R |
| 3,523,423 | 8/1970 | Young | 60/39.28 R X |
| 3,283,499 | 11/1966 | Scheidler | 50/39.28 R |
| 3,248,043 | 4/1966 | Taplin et al. | 60/39.28 R X |
| 3,603,023 | 12/1971 | Lazar et al. | 60/39.28 T |
| 3,307,353 | 3/1967 | Stearns | 60/39.28 R |
| 3,639,076 | 2/1972 | Rowen | 60/39.28 T X |
| 3,482,396 | 12/1969 | Nelson et al. | 60/39.28 R |
| 3,469,395 | 9/1969 | Spitsbergen et al. | 60/39.28 R |

Primary Examiner—Carlton R. Croyle
Assistant Examiner—Robert E. Garrett
Attorney, Agent, or Firm—Donald F. Bradley

[57] ABSTRACT

An integrated turbopropulsion system is disclosed consisting of a variable air induction system, a turbine engine and an exhaust nozzle/ejector. Control of the total system is provided by a plurality of basic control systems consisting of separate controls for each individual system variable. A supervisory control receives inputs from selected basic controls and from external signals, and provides additional inputs to the basic controls to permit the basic controls to increase the performance of the turbopropulsion system and to extend the control envelope of the total system. Additional basic controls may be added to the system, or basic controls may be subtracted from the system without affecting the performance of the entire turbopropulsion system. Novel basic controls for individual system variables are disclosed, as well as a novel integrator lockout control and a novel variable rate control. As a result of the intercommunication between individual basic controls provided by the supervisory control, the entire integrated turbopropulsion system may be controlled to more stringent limits than can be provided by a plurality of independent basic controls.

15 Claims, 20 Drawing Figures

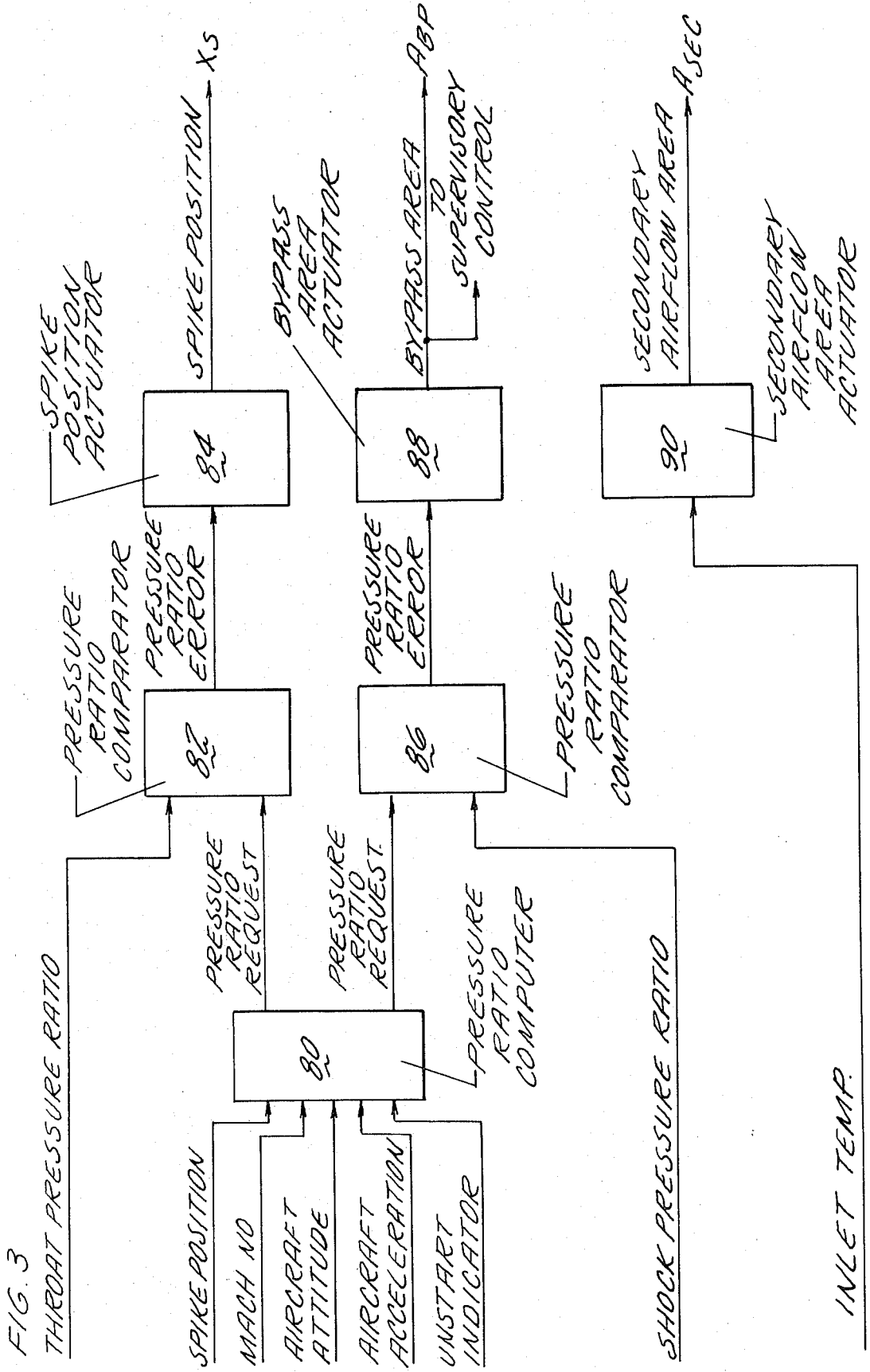

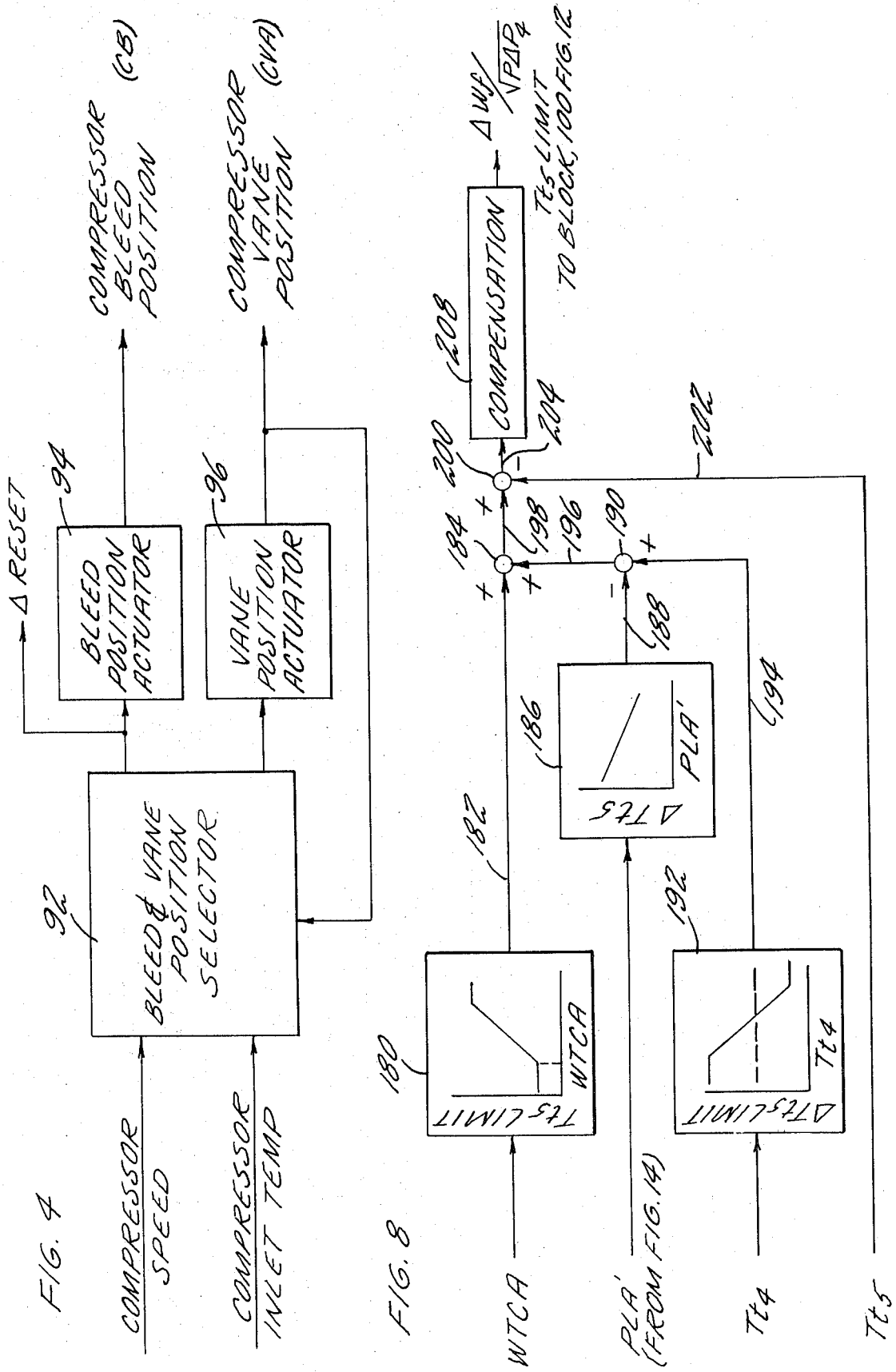

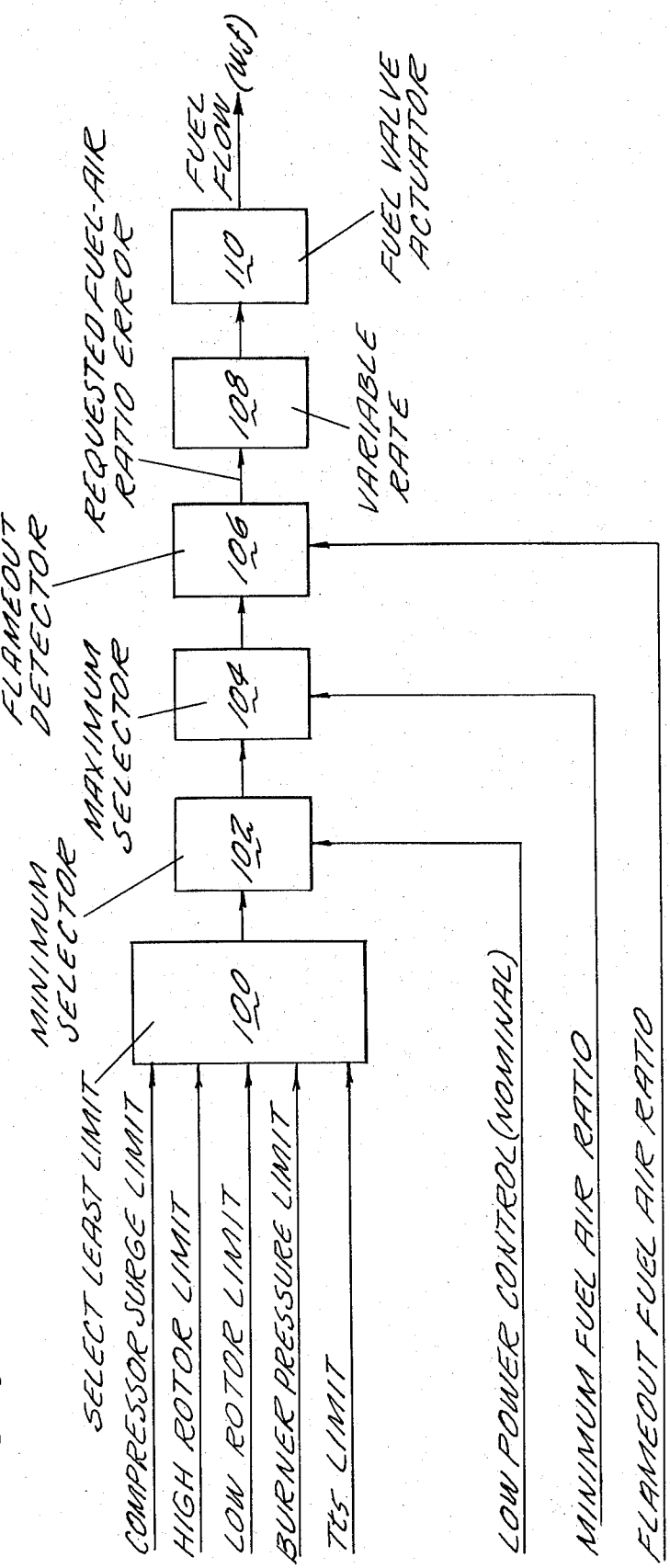

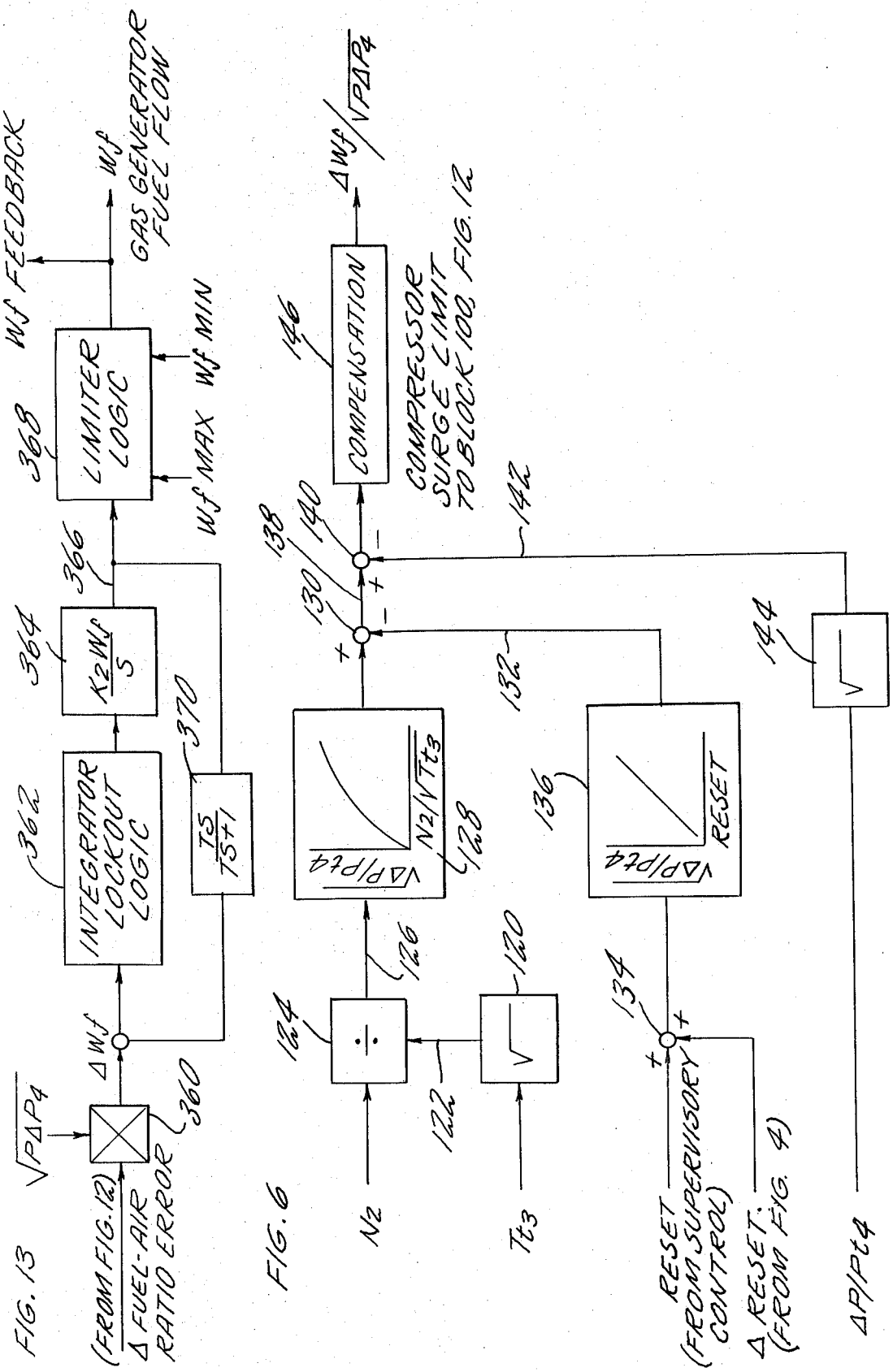

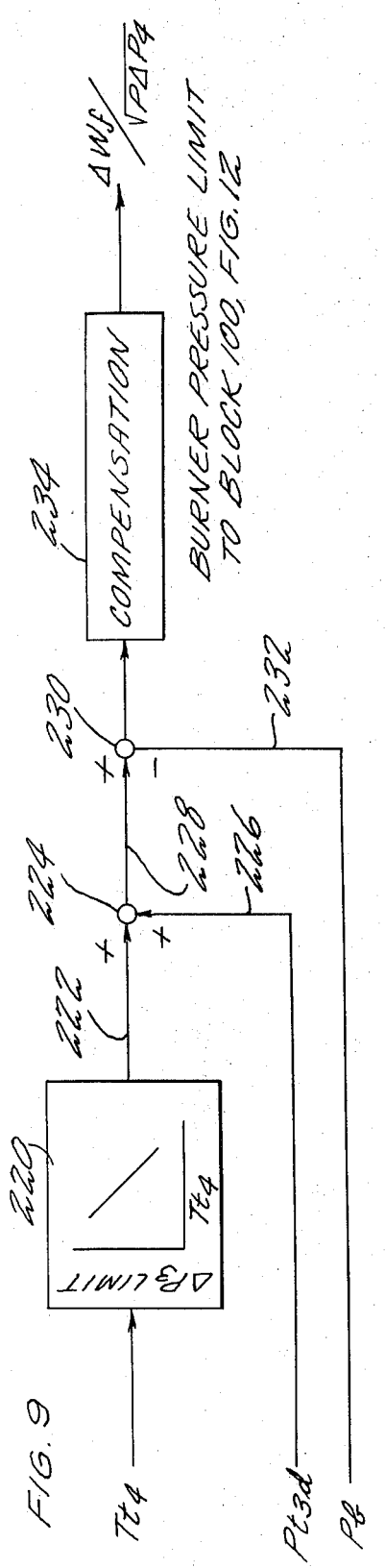
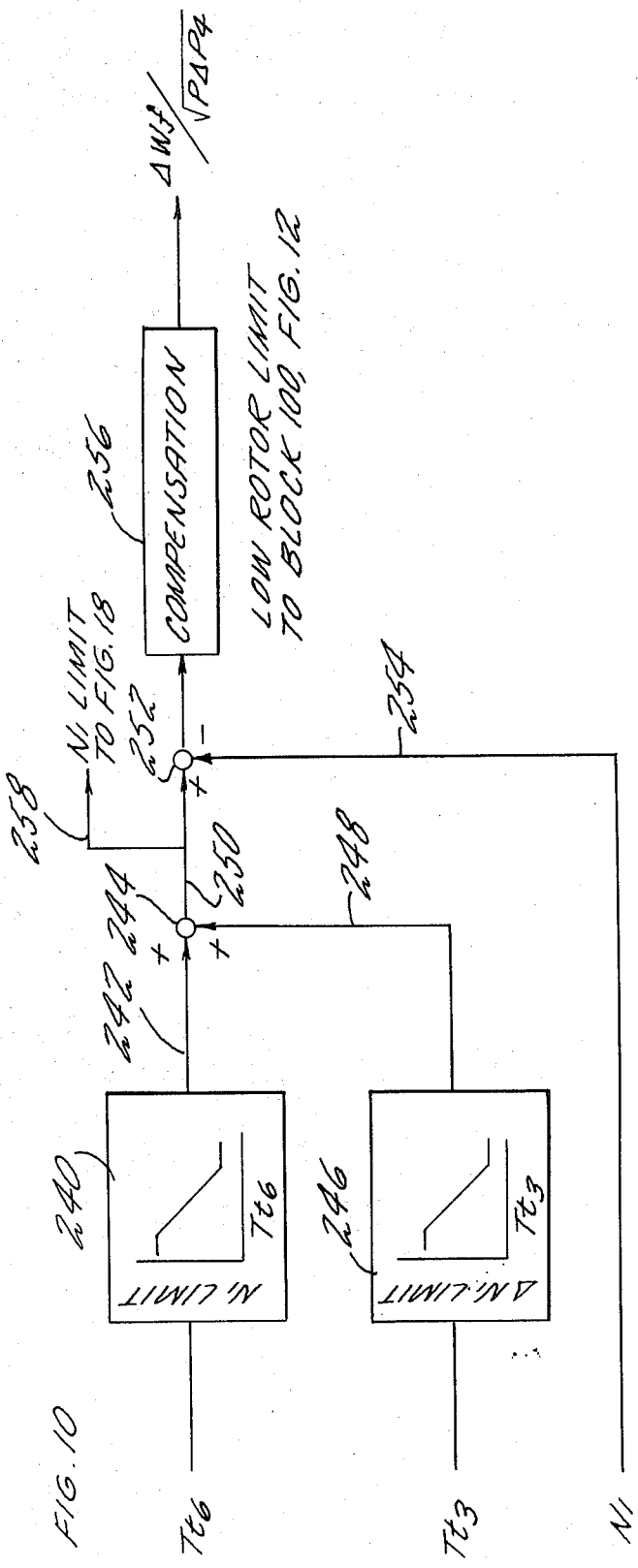

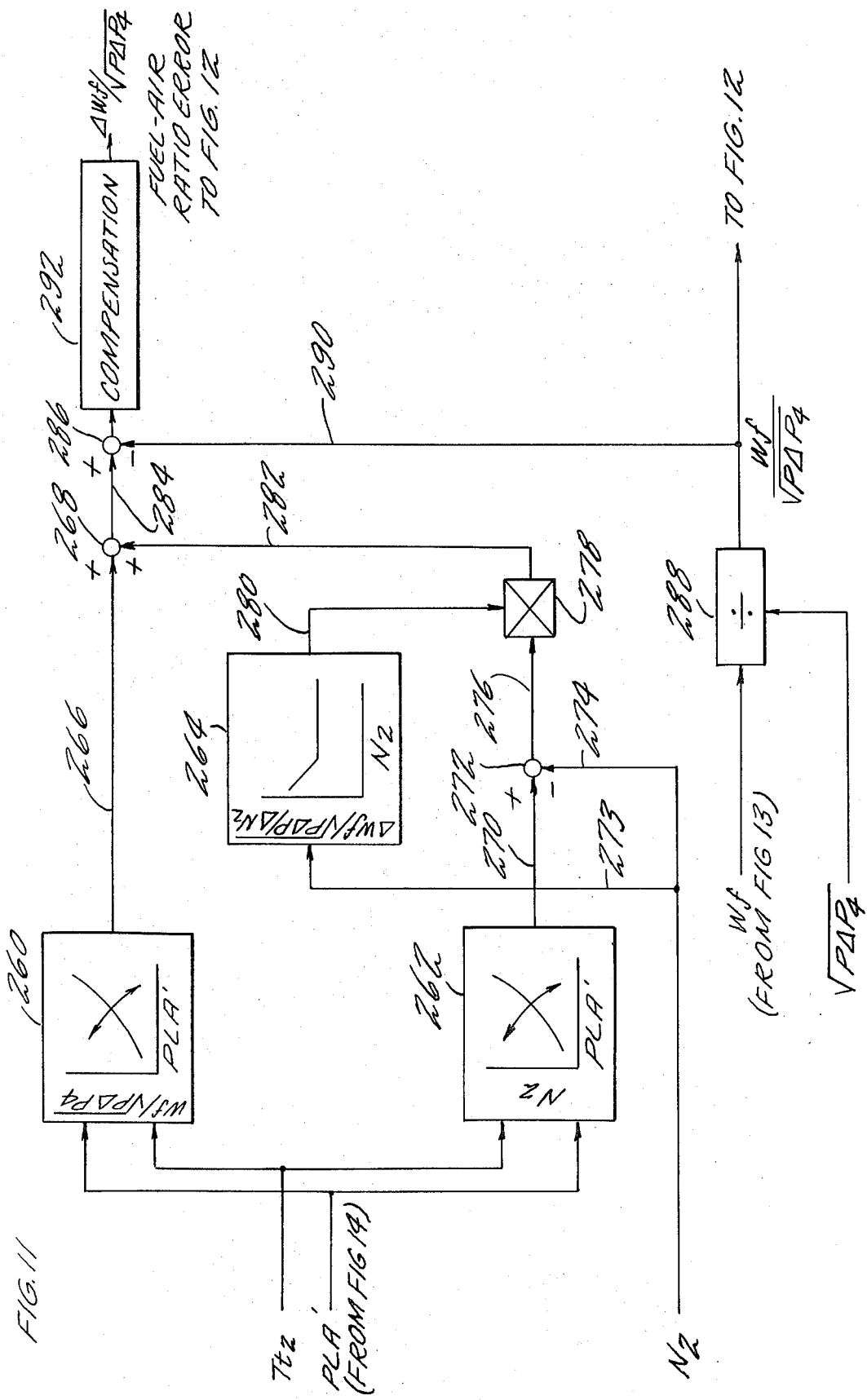

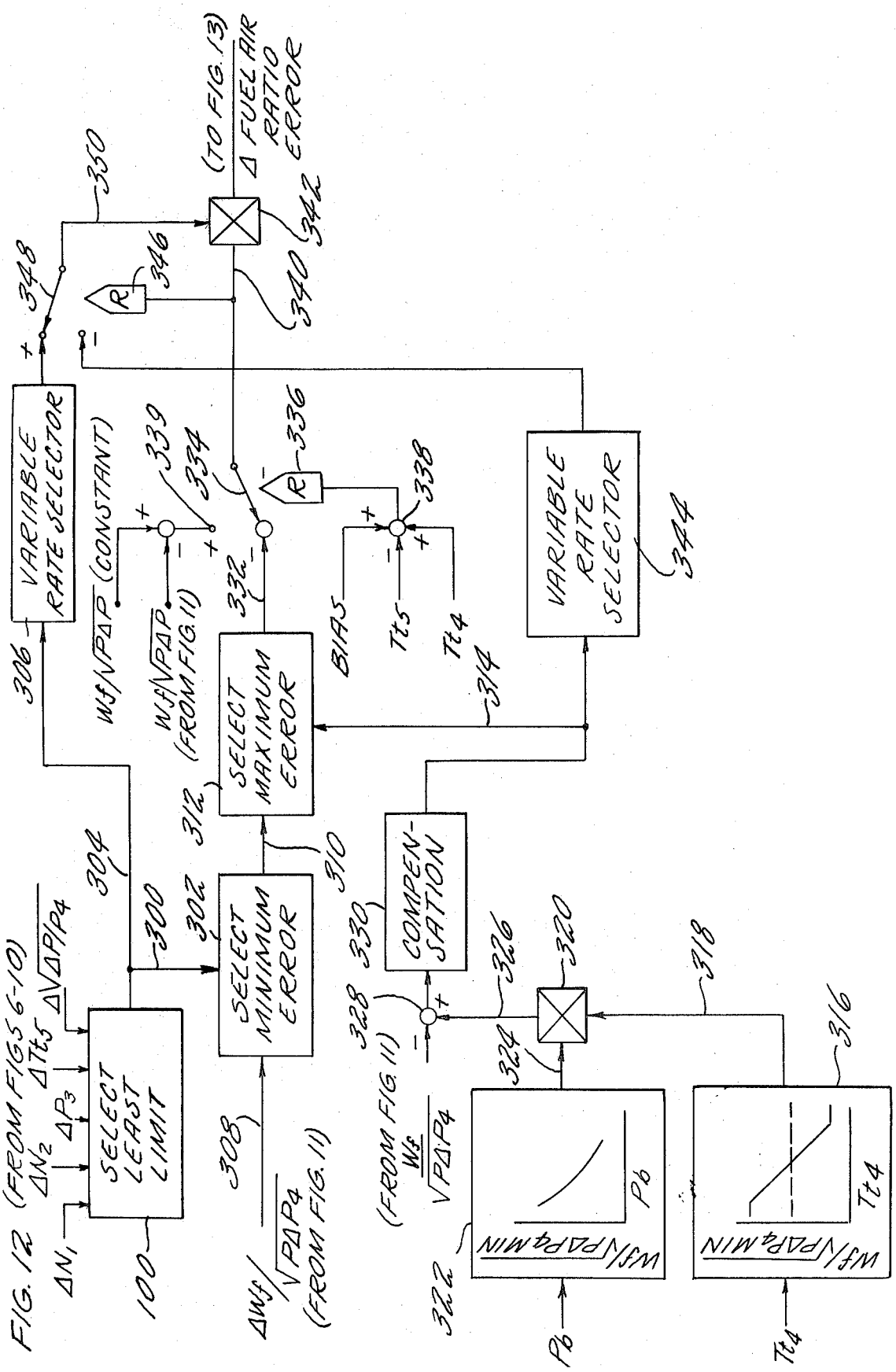

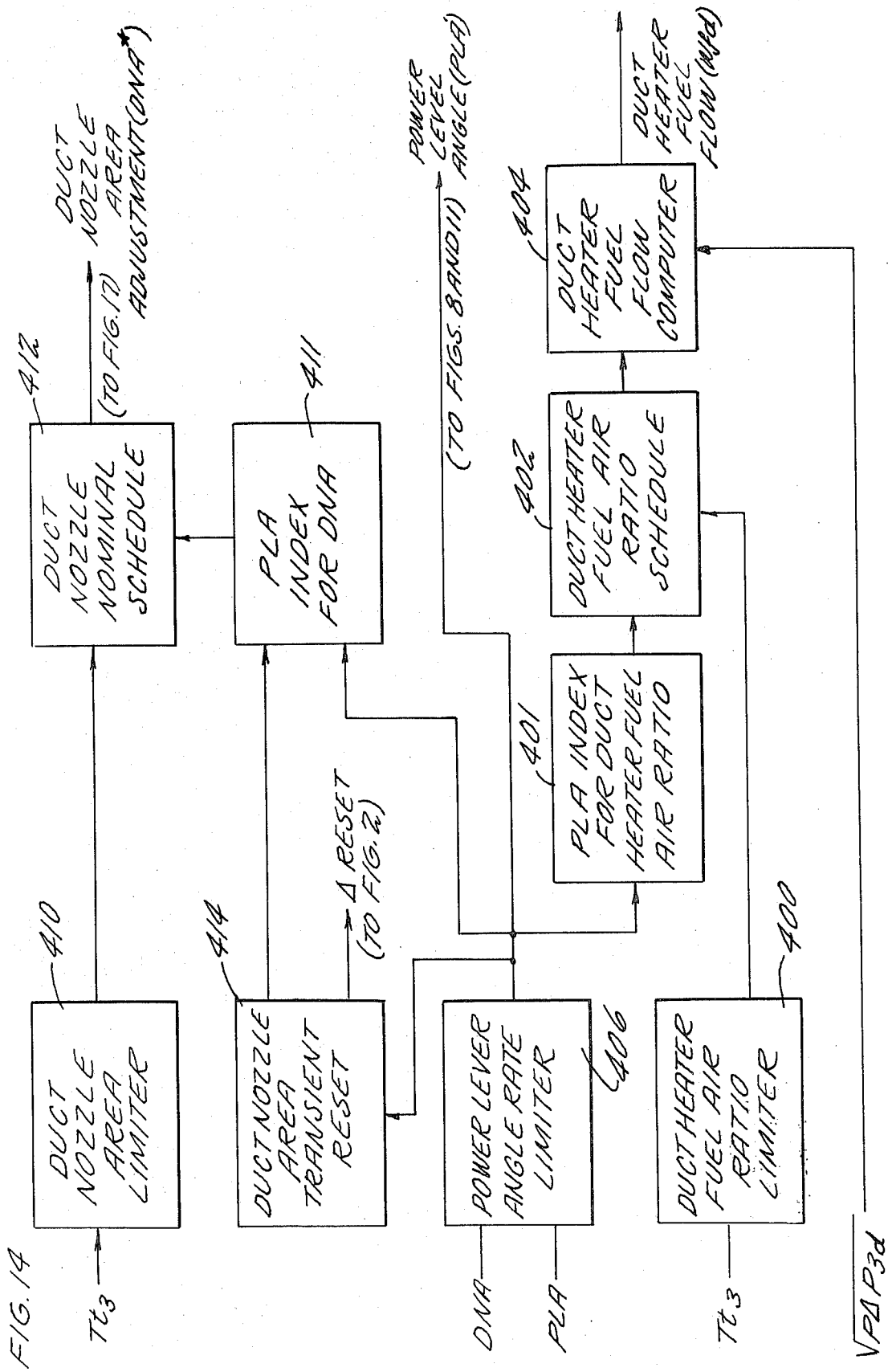

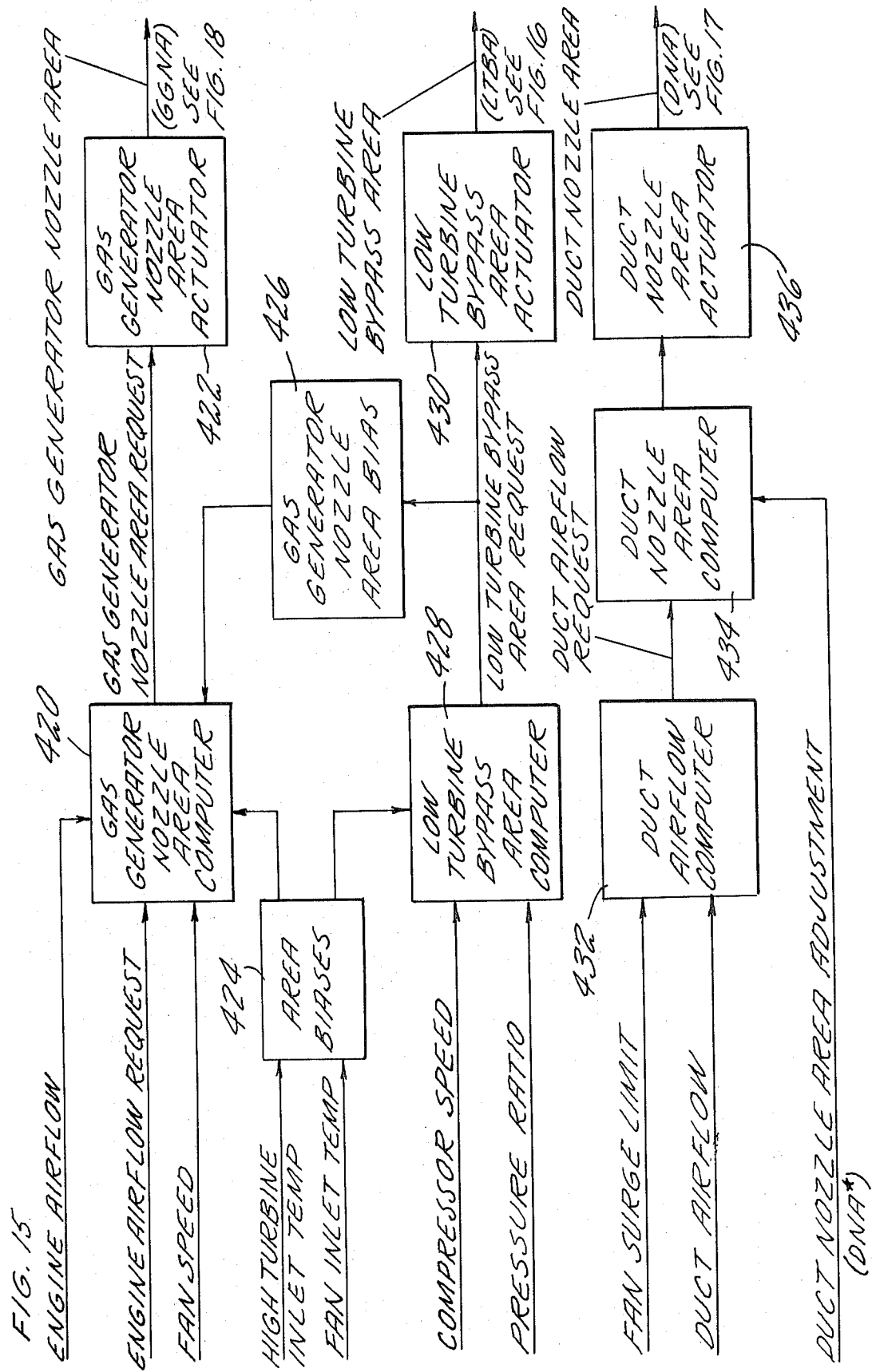

INTEGRATED CONTROL FOR A TURBOPROPULSION SYSTEM

This is a continuation of application Ser. No. 138,163, filed Apr. 28, 1971.

The invention herein described was made in the course of or under a contract with the Department of the Air Force.

BACKGROUND OF THE INVENTION

1. Field of the Invention

This invention relates to an integrated turbopropulsion system in which the control of a variable air induction system, an exhaust nozzle/ejector and a turbine engine are integrated. Individual basic controls are provided for each of the individual system variables. In addition, a supervisory control provides intercommunication between selected basic controls to permit the basic controls to operate closer to the limits of the turbopropulsion system and insure optimum system operation.

2. Description of the Prior Art

Historically the individual propulsion system components, namely, inlet, engine and ejector, have been procured separately and assembled by the aircraft manufacturer. In addition, controls for each of the individual components have also been procured separately. Intercommunication between the propulsion system controls was kept to a minimum to reduce the interaction between components, and to maintain the responsibility of the manufacturer for each component.

Advanced propulsion systems for present and future aircraft range from subsonic to supersonic flight speeds. For maximum system performance and effectiveness, the entire propulsion system must operate efficiently over the entire flight envelope of the aircraft, and continuous operation at or near physical operating limits requires improved propulsion system performance under severe environmental conditions.

The present integrated turbopropulsion system provides improved performance in that the propulsion system components are totally integrated in a single package, and the controls for each of the system components are fully integrated by a supervisory control with intercommunication being freely transmitted between the basic control systems to insure optimum system operation.

The turbopropulsion system described herein consists of an inlet, engine and ejector. The inlet is an external-internal compression air induction system with variable throat geometry, variable spillage bypass doors, and variable secondary airflow doors. The engine is a twin spool, split flow, duct heating turbofan with variable compressor bleed, variable compressor guide vanes, variable duct nozzle, variable low turbine bypass, and variable gas generator nozzle area. Two fueled regions are the gas generator combustor and the duct heater. The ejector consists of two variable areas and a mixing volume for the flow streams. The two variable areas are blow-in doors and a variable area ejector nozzle. Control of the entire turbopropulsion system provides improved performance by matching inlet and engine airflow, improving fuel consumption, and providing additional flow and control stability margin as well as additional performance and structural margin during critical operations.

A basic control system is provided for each individual system variable. In addition, a supervisory control provides integration of the entire turbopropulsion system control. The supervisory control receives input signals from various of the individual basic controls, and also receives external signals concerning aircraft operating conditions. From these various inputs, the supervisory control produces additional data for the basic control systems, adding to or subtracting from the basic controls in a manner to increase the system control envelope for the entire turbopropulsion system over and beyond the envelope provided by the basic control. In other words, the basic control, with additional inputs from the supervisory control, will operate the turbopropulsion system variable under its control closer to the limits which provide maximum performance than can the basic control itself. As a result, both performance and stability margin of the entire system are improved.

One advantage of the present invention involving the control of a turbopropulsion system by a supervisory control is that basic controls may be added to or subtracted from the system without radically affecting the overall control. The job of the supervisory control is to coordinate the control provided by each of the basic controls to the entire turbopropulsion system for the specific purpose of providing maximum system performance.

Different degrees of authority for an individual system variable may be assigned to the basic and/or supervisory control. It may be desired to control a variable only by the basic control, without any input from the supervisory control. On the other hand, if complete control of a variable is accomplished only by the supervisory control, this variable will be maintained at only one position if the supervisory control is removed or is rendered inoperative. In the present system, the supervisory control may be inactivated or removed, and the basic control systems provide a level of performance for each of the system variables to produce adequate, though less than optimum, performance of the turbopropulsion system without the supervisory control.

In addition to the supervisory control system disclosed herein, there is also disclosed novel basic controls for selected variables in a turbopropulsion system.

Additional novel features of the present invention include an integrator lockout control which insures that the control system does not extend its operation beyond the limits of the system controls, and a variable rate control which changes the compensation of a system variable depending on the direction and distance from a limit of the variable.

The control system of this invention will be described without reference to the particular components necessary to carry out the desired functions. In the present state of the art, many of the functions can be carried out purely by present day computers. Electronic, fluidic and/or hydromechanical components may be used in any combination to provide the necessary system functions as is well known to those skilled in the art.

SUMMARY OF THE INVENTION

In accordance with the present invention, there is provided an integrated turbopropulsion system consisting of a variable air induction system, a turbine engine and an exhaust nozzle/ejector. A basic control system is provided for each variable required to be controlled. In addition, there is provided a supervisory control which receives inputs from the basic controls and also receives external signals, the supervisory control then providing additional inputs to the basic controls to optimize the operation of the basic controls and to insure optimum control of the entire turbopropulsion system. Each basic control is sufficient to provide acceptable, though less than optimum, operation if the supervisory control is inactivated. Basic controls may be removed from the system, or additional basic controls added, depending on the precise configuration of the turbopropulsion system, without necessitating comprehensive changes in the supervisory control system.

In accordance with other aspects of the present invention, there are provided novel basic controls for individual system variables. These include a novel fan surge margin control, a novel gas generator fuel control system, a novel turbine inlet temperature control system, a novel gas generator rotor speed limit control, a novel surge margin limit control, and a novel low turbine bypass area control.

Other embodiments of the present invention include a novel integrator lockout control which utilizes logic to insure that a control system does not extend its operation beyond the limits of the system controlled.

A further embodiment of the present invention incorporates a novel variable rate control which adjusts the gain of a compensation network as a function of the direction of movement and distance from a limit of a controlled variable.

BRIEF DESCRIPTION OF THE DRAWINGS

FIG. 3 is a block diagram showing the details of the inlet geometry control of FIG. 2.

FIG. 4 is a block diagram showing the compressor geometry control of FIG. 2.

FIG. 5 is a block diagram showing additional details of the gas generator fuel control of FIG. 2.

FIGS. 6 through 13 show in partially schematic and partially block diagram form the specific details of the gas generator fuel control of FIG. 5.

FIG. 14 shows in block diagram form additional details of the duct heater fuel control of FIG. 2.

FIG. 15 shows in block diagram form additional details of the low turbine bypass control, duct heater nozzle control and gas generator nozzle control of FIG. 2.

DESCRIPTION OF THE PREFERRED EMBODIMENT

The Turbopropulsion System

Figure 1:
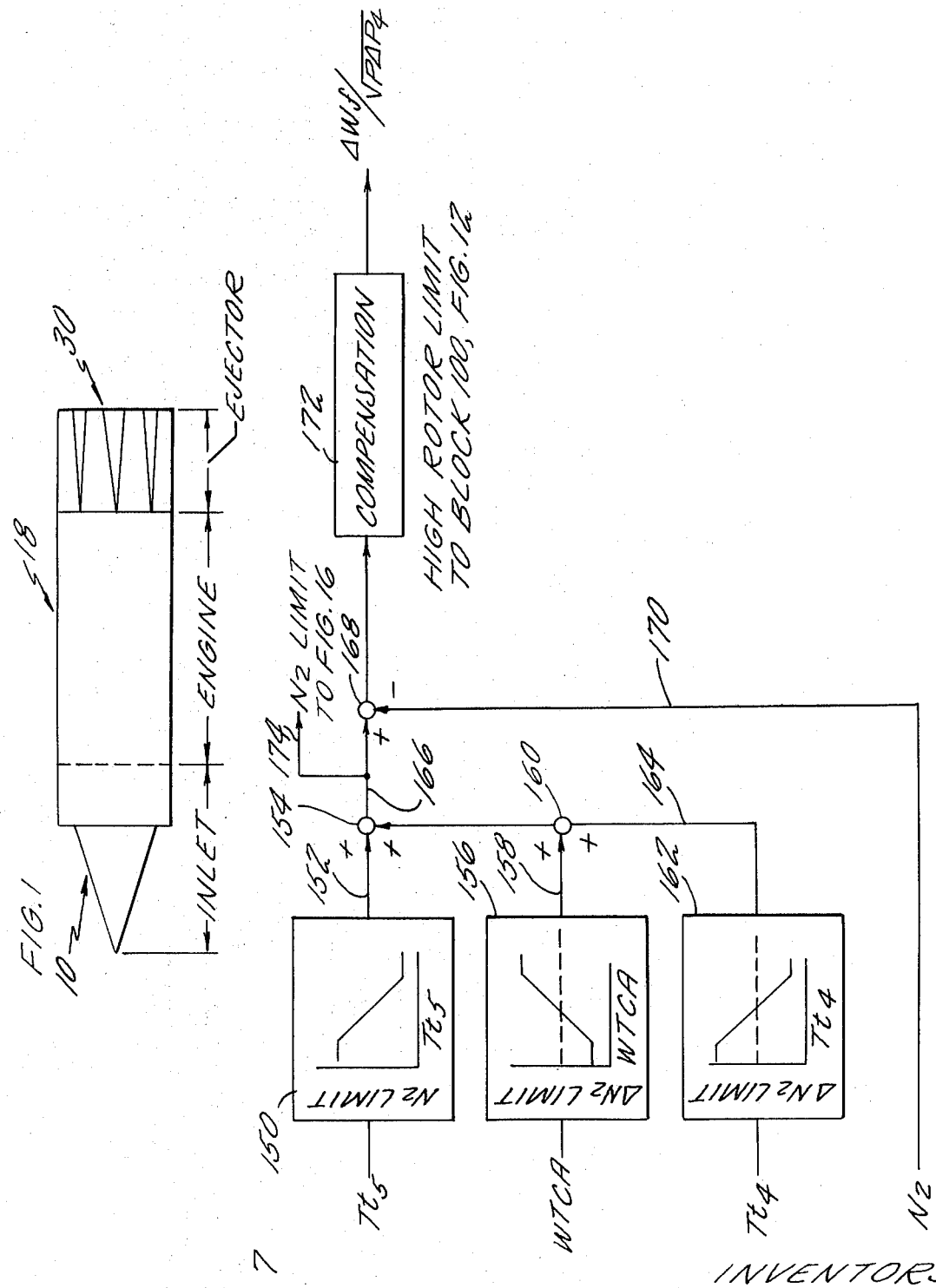
FIG. 1 is a schematic diagram of the integrated turbopropulsion system including the control variables.

FIG. 1 shows the integrated turbopropulsion system which is to be controlled. The turbopropulsion system consists of an inlet, an engine and an ejector.

The inlet 10 is an external-internal compression air induction system with a variable throat geometry controllable by movement of the inlet spike 12. The inlet 10 also contains variable spillage bypass doors 14, and variable secondary airflow doors 16.

The engine 18 is a twin spool, split flow, duct-heating turbofan with variable compressor bleed 20, variable compressor guide vanes 22, a variable duct nozzle 24, a variable low turbine bypass 26 and a variable gas generator nozzle area 28. Two fueled regions in the turbopropulsion system are the gas generator combustor 36 and the duct heater 38.

The ejector 30 consists of two variable areas, blow-in doors 32 and a variable area ejector nozzle 34, and a mixing volume.

The components of the turbopropulsion system including the inlet 10, engine 18 and ejector 30 are well known in the art. Likewise, the controlled variables and the means for controlling each variable are well known to those skilled in the art. It is also apparent that the teachings of the present invention may be applied to other turbopropulsion systems which contain additional variable elements, or from which variable elements have been eliminated depending on the application of the particular turbopropulsion system.

The Supervisory and Basic Control Systems

Figure 2:
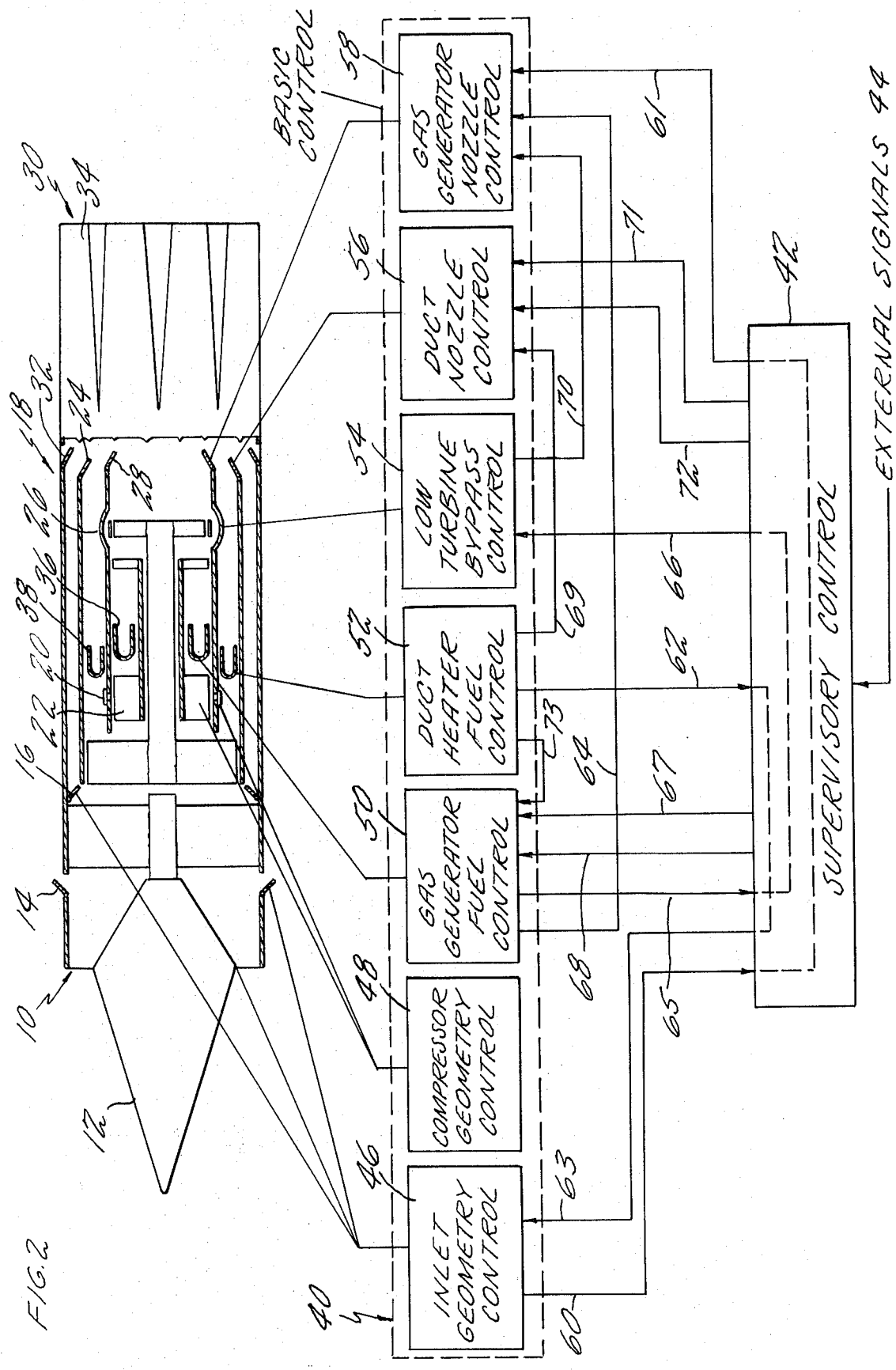
FIG. 2 shows in block diagram form the basic controls for the variables of the turbopropulsion system of FIG. 1, together with the interaction of the supervisory control with the basic controls.

FIG. 2 shows the relationship of the basic control systems for each of the turbopropulsion system variables, and their relationship of the supervisory control with respect to the basic control systems. The basic control systems are shown within a block labeled 40 and comprise a plurality of individual basic controls. The supervisory control 42 communicates with the basic control 40 as will be described in detail, receiving information from the basic control 40 and providing additional inputs to the basic control 40. Supervisory control 42 also receives external signals shown at 44. Not shown in FIG. 2 are the various inputs such as temperature, pressure, etc. which are fed from the turbopropulsion system to each of the individual controls which comprise basic control system 40 and on which each of the individual basic controls operates.

The basic control system 40 comprises the following individual basic controls. Inlet geometry control 46 operates to provide maximum inlet pressure to the face of engine 18 while minimizing pressure distortions and perturbations. Control of the inlet spike position 12 ($X_s$), inlet bypass door position 14 ($A_{BP}$) and secondary airflow door position 16 ($A_{SEC}$) are controlled by the inlet geometry control 46. Inputs to the inlet geometry control 46 include throat pressure ratio, actual spike position, shock pressure ratio, and aircraft attitude, acceleration and Mach number. The inlet geometry control will be described in detail in connection with FIG. 3.

The compressor geometry control 48 includes control of the compressor bleed 20 (CB) and control of the position of the variable compressor vanes 22 (CVA). The compressor bleed and compressor inlet guide vanes are both scheduled as a function of compressor speed and compressor inlet temperature. The compressor geometry control is described in additional detail in connection with FIG. 4.

The gas generator fuel control 50 generates an error signal ($W_f$) which controls the fuel flow by controlling the position of the fuel metering valve. This is the most complex of the basic control systems, and is described in further detail in connection with FIGS. 5 through 13. In general, seven error signals are generated and compared, with the error calling for the least fuel flow change selected to control the metering valve.

The duct heater fuel control 52 has the primary function of controlling the flow of fuel into the duct heater 38($W_{fd}$). Inputs to the duct heater fuel control include the duct inlet temperature, duct nozzle area, and power lever angle. Additional functions of the duct heater control are control of power lever rate and request of nominal duct nozzle area. The duct heater fuel control 52 is described in additional detail in FIG. 14.

The low turbine bypass control 54 controls the low turbine bypass area 26 (LTBA). This control is utilized to control gas generator speed, and thus control gas generator airflow. The duct heater nozzle control 56 controls the duct nozzle area 24 (DNA), which is used to control fan surge margin by providing a trim on fan airflow. The gas generator nozzle control 58 controls the gas generator nozzle area 28 (GGNA), which is utilized to control low rotor speed, thus providing control of total engine airflow. The low turbine bypass control 54, the duct nozzle control 56 and the gas generator nozzle control 58 are incorporated in the engine airflow control system described in additional detail in FIGS. 15, 16, 17 and 18.

The Supervisory Control System

The basic functions of the supervisory control 42 with respect to the basic control systems incorporated in block 40 are also shown in connection with FIG. 2. The details of the interrelationships between the various basic controls and the supervisory control 42 will be explained in detail in connection with subsequent drawings.

The inlet geometry control 46 supplies an inlet bypass door area position signal ($A_{BP}$) through line 60 to the supervisory control 42. This signal passes through the supervisory control as shown by the dotted lines and is transmitted via line 61 to the gas generator nozzle control 58. This signal on line 61 represents the desired engine airflow biased by the actual inlet airflow.

The duct heater fuel control 52 supplies an inlet geometry reset signal ($\Delta$ Reset) through line 62 to the supervisory control 42 where it is combined with the external signals 44 fed into the supervisory control 46 and transmitted to the inlet geometry control 46 through line 63. The external signals 44 supplied to the supervisory control are Mach number ($M_n$), pitch ($\alpha$) and yaw ($\beta$). A rate limited power lever angle signal is fed from duct heater fuel control 52 to the gas generator fuel control 50 via line 73.

The gas generator fuel control 50 transmits a low rotor ($N_1$) speed limit signal through line 64 to the gas generator nozzle control 58 where it is continuously compared to a requested low rotor speed ($N_1$) to insure safe operating speed. Gas generator fuel control 50 also transmits a high rotor ($N_2$) speed limit signal through line 65 to the supervisory control 42 where it is compared to the desired high rotor speed and transmitted via line 66 as a resultant low turbine bypass area trim signal to the low turbine bypass control 54. Supervisory control 42 transmits a compressor surge margin reset signal to the gas generator fuel control 50 via line 67 which limits fuel flow to maintain a desired surge margin plus reset. Supervisory control 42 also transmits a fuel flow trim signal to the gas generator fuel control 50 via line 68, this signal modulating fuel flow to maintain the desired turbine inlet temperature.

The duct heater fuel control 52 transmits an open loop duct heater nozzle area request signal (DNA*) to the duct heater nozzle control 56 via line 69. This signal, in the absence of trim signals, is the nozzle area request.

The low turbine bypass control 54 transmits a delta area signal ($\Delta$ LTBA) to the gas generator nozzle control 58 via line 70. This signal trims gas generator nozzle area minimizing interaction effects.

The supervisory control 42 also transmits a fan surge margin reset signal and a nozzle area trim signal to the duct heater nozzle control 56. The reset signal resets the area to increase fan surge margin, while the trim signal modulates the area to maintain a desired fan surge margin plus reset. These signals are transmitted via lines 71 and 72 respectively.

Additional functions performed by the supervisory control 42 will be described in connection with the description of the various basic control systems.

The Inlet Geometry Control

The inlet geometry control is described in detail in connection with FIG. 3. The features of the inlet geometry control are: first, optimum inlet spike control by direct sensing of aircraft Mach number and throat pressure ratio; second, throat Mach number control by selective positioning of inlet geometry; third, minimized shock disgorgement with inlet bypass area adjustment; and fourth, increased stability margin control by sensing aircraft acceleration and flight attitude.

The spike position ($X_s$) basic control positions the spike as a function of Mach number and maintains desired throat pressure ratio. Furthermore, the spike position basic control provides a Mach number switch that changes the control mode, and provides automatic restarting. The supervisory control provides inputs of Mach number and aircraft attitude (pitch and yaw) which are combined with signals indicative of spike position, aircraft acceleration and inlet unstart to a pressure ratio computer 80 which produces a signal indicative of throat pressure ratio request. The throat pressure ratio request signal is compared with the throat pressure ratio signal in pressure ratio comparator 82 to produce a throat pressure ratio error which actuates spike position actuator 84 to control the spike position in the inlet.

Spike position control is accomplished by an open loop schedule at low Mach number, and a closed loop schedule at high Mach number. At high Mach numbers, position is modulated to maintain a throat pressure ratio ($P_t/P_s$).

The spike position control provides control of Mach number at the throat of the inlet to the desired value. The desired pressure ratio is biased or reset whenever additional margin is required. The biases are yaw, pitch and local acceleration/deceleration (Mach number rate) and are provided by the supervisory control. Indication of an inlet unstart causes the spike to be moved to the maximum inlet flow area.

The inlet bypass door position control regulates the bypass area ($A_{BP}$) and regulates the bypass door position to maintain desired shock position. Additional functions of the bypass door area control are to reset the shock position for additional margin, to maintain the door wide open at low Mach numbers, and to provide automatic restarting. This control also provides a Mach number switch that changes the control mode.

Referring to FIG. 3, the shock pressure ratio request signal from block 80 is fed into a shock pressure ratio comparator 86 together with a shock pressure ratio signal. The shock pressure ratio comparator 86 produces a shock pressure ratio error signal which is fed to bypass area actuator 88 to produce the bypass area signal.

Bypass door position control is accomplished by an open loop schedule at low Mach numbers, and a closed loop schedule at high Mach numbers. At low Mach numbers, bypass doors are positioned full open to handle the excess air accepted by the inlet. At high Mach numbers, bypass doors are modulated to maintain a pressure ratio across the normal shock. The desired pressure ratio is scheduled as a function of Mach number and spike position. Biases to the desired shock pressure ratio are present as a function of a yaw, pitch and local acceleration/deceleration effects. Indication of an inlet unstart causes the bypass doors to move the full open position to restart the inlet.

A secondary airflow door area signal ($A_{SEC}$) schedules door position as a function of engine inlet temperature ($T_{t2}$). Secondary airflow is provided for the turbopropulsion system ejector to provide increased thrust and cooling, insuring structural integrity. There is no supervisory control requirement.

The Compressor Geometry Control

The compressor geometry control 48 of FIG. 2 is shown in detail in FIG. 4. The basic purpose of the compressor geometry control is to provide improved engine operation at off-design conditions. Referring to FIG. 4, compressor speed ($N_2$) and compressor inlet temperature ($T_{t3}$) signals are fed to a bleed and vane position selector 92 which produces position signals to control the bleed position actuator 94 and the vane position actuator 96. Bleed position actuator 94 produces a compressor bleed position signal (CB), and vane position actuator 96 produces a compressor vane position signal (CVA). Also generated is a delta reset signal in the compressor bleed position loop, this signal being fed to the gas generator fuel control 50 to be described later.

The compressor bleeds are two position units scheduled directly as a function of compressor speed and compressor inlet temperature. The compressor inlet guide vanes are modulated units also scheduled as a function of compressor speed and compressor inlet temperature. There are no supervisory control requirements for the compressor geometry control system in the embodiment shown.

The Gas Generator Fuel Control

The gas generator fuel control 50 of FIG. 2 is shown in greater detail in FIGS. 5 through 13. FIG. 5 shows the gas generator fuel control broadly in block diagram form, while FIGS. 6 through 13 shows the specific details of the control.

The purpose of the fuel control is to regulate the flow of fuel into the gas generator combustor 36 in the engine. The mechanical nozzles, valves, actuators, etc. necessary for fuel control are well known in the art, and will not be described here.

In accelerations and decelerations of a turbine engine, it is necessary to protect against particular engine limitations, for example, compressor surge, engine over speed, and turbine inlet over temperature. In most fuel controls this operation is accomplished by a single schedule that incorporates one or more of the most important engine limits. However, if the fuel control controls to many engine limits, more rapid accelerations and longer engine life can be produced.

The gas generator fuel control of this invention controls the gas generator so that engine operation is maintained at or between the most stringent of several upper and lower schedule limits. This novel system provides improved transient response, longer engine life and a more versatile control mode. Each limiting schedule is independent of other schedules, resulting in the control mode being adaptable to most control systems that operate to upper and lower limits. Since the individual limiting schedules are independent of other schedules, the engine limitations may be regulated without major schedule alterations when engine deterioration or changes in engine operation conditions cause a need for the adjustment of a specific engine limit.

For improved transient response, the limiting engine parameter in the present fuel control system may be a lower limit as well as an upper limit. This mode allows the engine to operate at or between the most stringent upper or lower limit, thus allowing the engine to respond to it fullest extent. By controlling many engine limits, better engine performance is possible. Conventional prior art methods are restricted in the number of engine limits that can be taken into account in describing an acceleration schedule. The present fuel control can handle any or all engine limitations, resulting in a more versatile control mode while maintaining safe engine operation for longer engine life.

FIG. 5 shows in block diagram form the essential elements of the gas generator fuel control. Five maximum limiting signals are generated within the control to insure that engine operation is maintained within acceptable limits. These limiting signals are a low rotor speed limit ($N_1$), high speed rotor limit ($N_2$), burner case pressure differential limit ($\Delta P_3$), turbine inlet temperature limit ($T_{t5}$) and compressor surge margin limit ($\sqrt{\Delta P/P_{t4}}$). The latter limit is maintained to a minimum instead of a maximum because the action necessary to maintain the limit is the same as for the other four maximum limits, namely, to reduce engine fuel flow.

The five maximum limiting signals described are fed into a selector 100 where the least of the five maximum limiting signals is selected, that is, the signal calling for the least fuel flow. This least fuel flow signal is passed to a minimum selector 102 together with a low power control or nominal signal which is the requested signal used for steady-state control at low and intermediate power settings. At high power settings the engine may be operating on one of the five maximum limits. The minimum selector 102 again choses the signal calling for the least fuel flow, that is, either the requested fuel flow signal, or the maximum limiting signal, whichever calls for the least fuel flow. The lower limit signal passed by minimum selector 102 is then fed to the maximum selector 104 together with a minimum fuel air ratio signal which calls for a minimum fuel flow to prevent engine flameout and is computed as a function of burner pressure and compressor discharge temperature. Maximum selector 104 choses the signal calling for the greater fuel flow, and passes this signal to a flameout detector 106. The flameout detector receives a flameout fuel air ratio signal which senses when a flameout occurs by comparing the temperature rise across the burner with a predetermined constant. The flameout detector determines when the rise is less than the constant, indicating that a flameout has occurred, and a fixed fuel air ratio is scheduled to prevent saturation of the output. In either case, a fuel air ratio error signal is passed from the flameout detector 106 to a variable rate circuit 108; this circuit minimizes fuel flow overshoots or undershoots. The variable rate circuit 108 provides variable gain as a function of magnitude of the requested fuel air ratio error signal input. The output of the variable rate circuit 108 is fed to the fuel valve actuator 110 which regulates the fuel flow to the gas generator portion of the engine in response to the fuel air ratio error and gas generator airflow ($\sqrt{P/\Delta P_4}$).

The gas generator fuel flow control provides increased transient protection with variable gain boundary limits, and it also provides engine integrity by operating within the most stringent limits. These features are illustrated in FIGS. 6 through 13 which shows the details of the gas generator fuel control described in connection with FIG. 5.

FIG. 6 shows the details of the compressor surge limit computation shown in FIG. 5 as feeding into the select least limit block 100 of FIG. 5. In FIG. 6 and in numerous subsequent Figures, computations are performed on various input signals as a function of a predetermined schedule. The input signals are derived by measurements performed within the turbopropulsion system itself, and involve measurements of pressures, temperatures, speeds, etc. Apparatus for performing these measurements is well known in the art, and will not be described in detail. The schedules are mathematical computations derived either from design criteria or from measurements made on the turbopropulsion system during operation. The present invention does not specify how the mathematical computations are performed, since it is known to those skilled in the art that the computations may be performed by electronic circuitry, by hydromechanical devices, by cams, by fluidic circuits or by any other means known in the art. Unless otherwise specified, the functions generated or the computations performed are also known in the art. However, in some cases the functions themselves are novel, and the combination of functions which produce the schedule for both the basic and supervisory control systems are unique.

In FIG. 6 compressor surge protection is provided by preventing compressor corrected airflow from dropping below the scheduled value. Corrected airflow is determined by sensing $\Delta P/P_4$ at the discharge of the compressor. The term $\Delta P$ is equivalent to the term $P_{t4} - P_{s4}$. The sensed $\Delta P/P_4$ is compared to a value scheduled as a function of compressor speed and compressor inlet temperature. The difference between the two provides the error signal which is fed to the least limit selector. Additional surge margin can be provided when required through a reset function from the supervisory control.

Previous control methods have assumed a surge margin based upon the design relationship between a turbine temperature or the fuel air ratio parameter $W_f/P_b$ and the compressor surge line. These control methods do not represent compressor performance characteristics and have the shortcoming of excessive surge margin in areas where engine development time is not sufficient to explicitly define the surge line and corresponding temperature and/or $W_f/P_b$ schedules. Another disadvantage of these methods is that changes in combustor or turbine performance can degrade compressor performance causing increased acceleration times or even compressor surge.

Referring specifically to FIG. 6, compressor inlet temperature ($T_{t3}$) is fed into block 120 where the square root function is performed. The $\sqrt{T_{t3}}$ signal is then fed through line 122 into block 124 where it is mathematically divided into a compressor rotor speed ($N_2$) signal which results in a signal indicative of corrected speed ($N_2/\sqrt{T_{t3}}$). This corrected speed signal is then fed as an input through line 126 to function generator 128 which schedules a desired compressor exit airflow parameter ($\sqrt{\Delta P/P_{t4}}$) as a function of the corrected speed parameter $N_2/\sqrt{T_{t3}}$. The output of function generator 128 is fed to junction 130 where it is combined with a bias also fed to junction 130 through line 132. An external Reset signal from the supervisory control 42 of FIG. 2 is combined with an internal $\Delta$ Reset signal generated in FIG. 4, at junction 134. The Reset signal is a request for increased surge margin due to aircraft maneuvers or aircraft operating mode. $\Delta$ Reset is a bias to the scheduled surge margin and is a function of compressor bleed position. The combined Reset and $\Delta$ Reset signals from junction 134 are fed to function generator 136 where a signal indicative of $\Delta \sqrt{\Delta P/P_{t4}}$ is produced and fed through line 132 to junction 130. The output from function generator 136 may be of a transient nature during aircraft maneuvers and armament firing, or a steady-state bias depending upon compressor bleed position or anticipated turbulence. The delta signal on line 132 is combined at junction 130 with the scheduled signal produced by function generator 128 to produce a signal on line 138 which provides a discreet schedule of the parameter $\sqrt{\Delta P/P_{t4}}$. This is a desired compressor exit airflow parameter which is fed to junction 140 where it is compared with an actual $\sqrt{\Delta P/P_{t4}}$ signal from line 142. The parameter $\Delta P/P_{t4}$ is measured and fed to block 144 where its square root is computed. The error signal produced at junction 140 by comparison of the scheduled parameter with the measured parameter is then fed through a compensation network shown at block 146 and fed as the compressor surge limit signal to block 100 in FIG. 5. The error signal $\Delta \sqrt{\Delta P/P_{t4}}$, when selected, is then used in computing the desired gas generator fuel flow.

The advantage of the control shown in FIG. 6 is that surge margin limiting is based upon a unique compressor flow parameter and not inferred from a combustor or turbine parameter.

FIG. 7 shows the generation of the high rotor ($N_2$) limit signal which is fed to block 100 in FIG. 5.

Demands of higher performance from turbine engines require that the rotor speed operate closer to the structural limit. FIG. 7 describes a control mode whereby all rotor stress limiting parameters are better accounted for allowing improved weight-to-speed rotor design.

Previous control methods have limited $N_2$ speed based upon a fixed value of speed or a speed biased by engine inlet temperature. The disadvantage of this method is that speed limiting is based upon an assumed maximum rotor temperature thereby limiting $N_2$ speed, in many cases, much lower than is actually necessary.

In FIG. 7, the limiting high rotor speed is scheduled as a function of compressor discharge temperature ($T_{t4}$), turbine inlet temperature ($T_{t5}$), and turbine cooling airflow (WTCA). WTCA may be sensed as a function of compressor discharge pressure, compressor discharge airflow or sensed directly as a $(P_t-P_2)/P_t$ at the regulated point. The scheduled limit is compared to the actual $N_2$ speed, with the difference providing the error signal to the least limit selector 100 of FIG. 5.

Referring specifically to FIG. 7, turbine inlet temperature $T_{t5}$ is measured and fed into function generator 150 where a signal indicative of $N_2$ limit is generated and fed through line 152 to junction 154. The $N_2$ limit versus $T_{t5}$ function in block 150 indicates that the $N_2$ limit would decrease as turbine inlet temperature increases, that is, the rotor must run slower as turbine inlet temperature increases to maintain constant stress margin.

The $N_2$ limit signal generated is biased as a function of the turbine cooling airflow. Turbine cooling airflow WTCA is measured and fed into function generator 156 where a $\Delta N_2$ limit signal is generated and fed through line 158 to junction 160. Also fed to junction 160 is a $\Delta N_2$ limit signal generated in block 162 as a function of turbine cooling air temperature ($T_{t4}$) and fed through line 164. Both the WTCA and $T_{t4}$ signals produce $\Delta N_2$ limits which bias the $N_2$ limit generated as a function of $T_{t5}$. The $N_2$ limit signal is increased with increases in turbine cooling airflow, and decreased as the turbine cooling airflow temperature increases.

The $N_2$ limit signal biased by the turbine cooling air parameters is fed from junction 154 through line 166 to a junction 168 where it is combined with a measured $N_2$ signal fed to junction 168 through line 170. Thus, at junction 168 the desired $N_2$ limit on line 166 is compared with actual $N_2$ speed, and a $\Delta N_2$ limit or error signal is produced which is fed through a compensation network 172 to the least limit selector. The $N_2$ limit error is then used in computing a desired change in gas generator fuel flow. The $N_2$ limit signal is also fed through line 174 to the engine airflow control to be described subsequently.

The advantage of the control of FIG. 7 is that all rotor stress factors are accounted for, and the rotor can be designed lighter while maintaining rotor design life. While this control is specifically addressed toward the high speed rotor of a turbine engine, it is equally applicable to other rotors in multispool turbine engines.

FIG. 8 shows the computation of the high turbine inlet temperature ($T_{t5}$) limit signal which is fed to least limit selector circuit 100 in FIG. 5. Previous control methods have attempted to control turbine inlet temperature by inference based upon open $W_f/P_b$ schedules, or by using other temperatures and assuming a known $\Delta T$ to turbine inlet temperature. The disadvantage of previous methods is that turbine metal temperatures were assumed from both an inferred turbine inlet temperature and an assumed cooling airflow when used. Control of or limiting turbine inlet temperature is primarily for the protection of turbine inlet nozzles (guide vanes) in that the first rotor and blades are offered protection by the control system described in FIG. 7 above. Best engine performance occurs at maximum turbine inlet temperature, therefore a control loop to achieve maximum turbine inlet temperature, but not exceeding that which would cause damage to the turbine nozzles, is included as part of the present system.

Air cooling of gas generator engine turbines has become necessary to prevent metal distress as turbine inlet temperature is increased above allowable metal temperature. The control mode shown in this FIG. 8 provides a method for controlling turbine inlet temperature based on turbine cooling airflow and turbine cooling airflow temperature. Changes in cooling airflow can cause higher metal temperatures at constant gas temperatures. The advantage of the present control method is that turbine metal temperature is a result of the heat input and output components, with only the heat transfer coefficient assumed, thereby allowing improved maximum gas generator performance while insuring design life. To accomplish the advantages noted the allowable high turbine inlet temperature ($T_{t5}$) is scheduled as a function of power lever angle (PLA'), compressor discharge temperature ($T_{t4}$) and turbine cooling airflow rate (WTCA). The actual temperature is compared to the scheduled temperature, with the difference providing the error signal to the least limit selector 100.

Referring specifically to FIG. 8, a signal indicative of turbine cooling airflow rate (WTCA) is fed to function generator 180 from which a $T_{t5}$ limit signal is produced and fed through line 182 to junction 184. Biases to the $T_{t5}$ limit signal are provided by signals indicative of power lever angle (PLA') and turbine cooling air temperature ($T_{t4}$). The PLA' signal is generated as shown in FIG. 14, and is fed through function generator 186 where a $\Delta T_{t5}$ signal is generated and fed through line 188 to junction 190. Likewise fed to junction 190 is a $\Delta T_{t5}$ limit signal generated in function generator 192 as a function of $T_{t4}$ and fed to junction 190 through line 194. The $\Delta T_{t5}$ signal on line 188 is subtracted from the $\Delta T_{t5}$ limit signal on line 194 at junction 190. The resulting signal is fed as a bias to the $T_{t5}$ limit signal through line 196 to junction 184. As may be seen from the shape of the function curves in blocks 180, 186 and 192, the allowable high turbine inlet temperature is increased with increases in turbine cooling airflow, WTCA, but is reduced as the temperature of the turbine cooling air $T_{t4}$ increases. Furthermore, when the pilot requests additional speed by moving the power lever angle forward, additional $T_{t5}$ limit is provided by reducing the bias to the $T_{t5}$ limit signal.

The $T_{t5}$ limit signal generated at junction 184 is fed through line 198 to junction 200 where it is compared with the actual turbine inlet temperature $T_{t5}$ signal fed to junction 200 through line 202. The resultant signal is then fed through line 204 and through switch 206 to compensation circuit 208 and from there to the least limit select circuit 100 of FIG. 5.

FIG. 9 shows in detail the generation of the burner differential pressure limit ($\Delta P_b$) fed as an input to the least limit select circuit 100 of FIG. 5. The allowable burner case pressure differential limit is scheduled as a function of compressor discharge temperature ($T_{t4}$). Compressor discharge temperature and turbine cooling air temperature are both referred to as $T_{t4}$, since a portion, approximately 2 percent, of the compressor discharge airflow bypasses the combustor and is used to cool the turbine blades. The actual duct pressure $P_{t3d}$ is added to the $T_{t4}$ signal, generating an allowable burner pressure. The actual burner pressure is compared to the allowable pressure with the difference providing the error signal to the least limit selector circuit.

Referring specifically to FIG. 9, the compressor discharge temperature $T_{t4}$ is fed to function generator 220 where a signal indicative of $\Delta P_3$ limit is generated and fed through line 222 to junction 224. To this signal is added the actual duct pressure signal $P_{t3d}$ measured in the engine through line 226. The allowable burner pressure signal from junction 224 is fed through line 228 to junction 230 where it is compared to the actual burner case pressure signal $P_b$ fed to junction 230 through line 232. The burner pressure error signal generated at junction 230 is fed through a compensation network 234 and then to the least limit select circuit. As may be expected, the allowable burner case pressure differential limit signal decreases with increases in compressor discharge temperature.

FIG. 10 shows the computation of the low rotor limit signal $N_1$ fed to the least limit select circuit 100 of FIG. 5. The limiting low rotor (fan) speed is scheduled as a function of fan discharge temperature $T_{t6}$. This signal is biased by compressor inlet temperature $T_{t3}$, and the desired $N_1$ signal is then compared to the actual low rotor speed $N_1$ signal, with the difference providing the error signal to the signal selecting logic elements in the least limit selector.

Referring specifically to FIG. 10, the fan discharge temperature $T_{t6}$ is fed to function generator 240 where an $N_1$ limit signal is generated and passed through line 242 to junction 244. A $\Delta N_1$ limit signal is generated in function generator 246 as a function of compressor inlet temperature $T_{t3}$ and fed through line 248 to junction 244. The $\Delta N_1$ limit signal is a bias on the $N_1$ limit signal, and the resultant $N_1$ limit signal is fed through line 250 to junction 252 where it is compared with an actual $N_1$ signal fed to junction 252 through line 254. The $N_1$ error signal which provides the low rotor speed limit is then fed through compensation network 256 to the least limit select circuit. As shown by the function generator blocks 240 and 246, the $N_1$ limit decreases with increasing fan discharge temperature, and is reduced slightly as the compressor inlet temperature increases. An $N_1$ limit signal is also fed to the gas generator nozzle area control, FIG. 18, via line 258.

The five maximum limiting signals generated as shown in FIGS. 6-10 are fuel air ratio error signals which provide the operating limits for the various engine variables by regulating the fuel flow in the gas generator portion of the engine. These signals will be converted to a fuel flow ($W_f$) signal before being fed to the fuel metering valve. This computation occurs in FIG. 13.

FIG. 11 shows the details of the computation of the low power control or nominal signal shown in FIG. 5 as being fed to minimum selector 102. This nominal signal is in fact a requested error signal used for steady-state gas generator control at low and intermediate power settings. Power lever position (PLA') and fan inlet air temperature ($T_{t2}$) schedule desired high rotor speed ($N_2$) and fuel air ratio ($W_f/\sqrt{P\Delta P_4}$) signals. Actual $N_2$ speed is then compared to the desired $N_2$ speed, and the error multiplied by a fuel air ratio (governor slope) scheduled by actual $N_2$ speed to obtain a desired or requested fuel air ratio signal. In addition, actual fuel flow ($W_f$) and actual burner airflow ($\sqrt{P\Delta P_4}$) are determined and an actual fuel air ratio is calculated. The actual and desired (requested) fuel air ratios are compared, with the difference providing the error signal which is fed to minimum selector 102 of FIG. 5.

Referring specifically to FIG. 11, the fan inlet air temperature signal $T_{t2}$ and the power lever angle PLA' signal (see FIG. 14) are fed as shown to two different function generators, 260 and 262. Function generators 260 and 262 are bivariant curves, but are shown only as a function of PLA'. The fan inlet air temperature signal $T_{t2}$ biases the curves shown in function generator block 260 and 262 up or down.

The $T_{t2}$ and PLA' signals fed into block 260 generate a fuel air ratio signal $W_f/\sqrt{P\Delta P_4}$ as a function of the two input signals, and this fuel air ratio signal is fed through line 266 to junction 268. This is the scheduled fuel air ratio signal. The $T_{t2}$ and PLA' inputs to function generator 262 generate an $N_2$ desired compressor speed signal as a function of the two inputs, and this desired high rotor speed signal is fed through line 270 to junction 272. Also fed to junction 272 through line 274 is the actual $N_2$ or high rotor speed signal. The desired $N_2$ signal on line 270 is compared with the actual $N_2$ signal on line 274 at junction 272, and the $N_2$ speed error signal is fed through line 276 to multiplier 278.

Function generator 264 receives an $N_2$ input via line 273 and generates a governor slope signal which is fed through line 280 to multiplier 278. In block 278 the speed error signal in line 276 is multiplied by the appropriate governor slope to produce a fuel air ratio error signal on line 282 which is fed to junction 268. The fuel air ratio error signal on line 282 may be negative or positive. In any case, the fuel air ratio error signal on line 282 is added to the scheduled fuel air ratio signal on line 266 in junction 268, and the resultant fuel air ratio request signal is fed through line 284 to junction 286.

A fuel air ratio $W_f/\sqrt{P\Delta P_4}$ is measured by determining fuel flow $W_f$ and burner airflow $\sqrt{P\Delta P_4}$, performing the division in block 288, and feeding the fuel air ratio signal through line 290 to be compared with the fuel air ratio request signal fed through line 284 at junction 286. The fuel air ratio signal on line 290 involves a measurement of total to static pressure. The fuel air ratio signal on line 280 is also fed as an input to FIG. 12.

The comparison of the two signals at junction 286 results in a fuel air ratio error signal which is fed through compensation network 292 and is the nominal or requested low power control signal fed to minimum selector 102 in FIG. 5.

FIG. 12 shows in detail the functions shown in FIG. 5 as the least limit selector 100, the minimum selector 102, the maximum selector 104, the flameout detector 106 and a portion of the variable rate circuit 108, together with the computations for the minimum fuel air ratio error and flameout fuel air ratio signals.

Referring specifically to FIG. 12, the least limit selector circuit 100 of FIG. 5 is also shown in this figure. The five maximum limiting signals shown in FIG. 5 as feeding into block 100 and described in detail in connection with FIGS. 6-10 are shown also in FIG. 12. The five error signals, which are a function of $\Delta N_1$, $\Delta N_2$, $\Delta P_3$, $\Delta T_{t5}$ and $\Delta \sqrt{\Delta P/P_4}$, are compared in the least limit selector 100 and the minimum signal selected. In other words, that signal which will call for the minimum fuel flow is passed through the least limit selector circuit 100, this signal being the minimum of the maximums. A negative signal is considered to be more minimal than a positive signal in the selection process, and the most negative of these signals is selected for transmission to the next group of signal selecting logic elements. The selected signal is passed from selector 100 through line 300 to a minimum error selector circuit 302, and also passed through line 304 to a variable rate selector circuit 306.

Also fed to the minimum error selector 302 through line 308 is the fuel air ratio request signal generated in FIG. 11. Minimum error selector 302 selects the signal calling for the minimum or least error and passes this selected signal through line 310 to a maximum error selector 312. Minimum error selector 302 operates in a manner similar to least limit selector circuit 100 in that the signal calling for the lower fuel air ratio error will be selected and passed through the circuit. In other words, if the engine is operating on one of the five maximum limits, the signal at line 300 will be calling for the lower fuel air ratio and will be the one passed through minimum error selector 302. However, if the pilot reduces the power lever, it is likely that the signal passed on line 308 to the minimum error selector 302 will be calling for the lesser fuel air ratio error, and this will be the signal passed through minimum error selector 302.

Also fed to maximum error selector circuit 312 via line 314 is the minimum fuel air ratio error signal shown in FIG. 5 as being fed into maximum selector 104. This minimum fuel air ratio signal is a limiting signal based on a fuel air ratio generated by compressor discharge temperature $T_{t4}$ and burner pressure $P_b$. Compressor discharge temperature $T_{t4}$ is fed into function generator 316 where a minimum fuel air ratio bias signal is generated and fed via line 318 to multiplier 320. The burner pressure signal $P_b$ produces in function generator 322 a minimum fuel air ratio signal which is fed via line 324 into multiplier block 320. The two signals are combined in multiplier 320 and the resultant desired fuel air ratio is fed via line 326 to junction 328 where it is compared with the actual fuel air ratio signal generated in FIG. 11, the difference providing the minimum fuel air ratio error signal which is fed to line 314 through compensation network 330. The minimum fuel air ratio error or minimum limiting signal will always call for a fuel flow which is sufficiently high to prevent blowout of the flame in the gas generator portion of the engine. In other words, regardless of the fuel flow called for by the pilot or by the maximum limiting signal, a fuel flow signal will always be present which calls for sufficient flow of fuel to the engine to prevent flameout.

Maximum error selector circuit 312 passes the signal from lines 310 or 314, whichever is the signal calling for the larger fuel air ratio error. Normally it is the fuel air ratio signal from line 310 which is passed through maximum error selector 312, since during normal operation the setting of the power lever will be calling for more flow of fuel than is required to prevent flameout of the engine.

The fuel air ratio error signal passed by maximum error selector 312 is then fed through line 332 to switch 334 operated by relay 336. A closed loop control of the type disclosed herein has the capability of saturating the output function. If a flameout is encountered, the fuel metering valve may saturate to the full open position unless corrective action is taken. To overcome this problem, a flameout is sensed by comparing the temperature rise across the burner with a predetermined constant. When the rise is less than the constant, a flameout has been encountered, and a fixed fuel air ratio is scheduled. The flameout fuel air ratio signal and the flameout detector 106 are shown in FIG. 5 in schematic form. To accomplish this function, the turbine inlet temperature $T_{t5}$ is compared with the compressor discharge temperature $T_{t4}$ at junction 338. A bias is added to the junction of a magnitude and polarity so that during normal engine operation $T_{t5}$ will always be larger in magnitude than the sum of $T_{t4}$ plus the bias, and the relay 336 will always have a negative voltage applied thereto which keeps switch 334 connected with line 332. However, if a flameout occurs in the engine, there will be little or no temperature rise across the burner, and $T_{t5}$ will approach $T_{t4}$. In this case, the sum of $T_{t4}$ plus the bias will be larger in magnitude than $T_{t5}$, the relay will receive a positive signal, and switch 334 will be connected with junction 339 where a signal equal to the difference between a constant $W_f/\sqrt{P\Delta P}$ and the measured value appears. When the engine is restarted, $T_{t5}$ will increase and the switch 334 will revert to its normal operation.

A variable rate is incorporated into the fuel control to minimize fuel flow overshoots or undershoots beyond limits. This is accomplished by comparing the nominal fuel air ratio error with the selected maximum limiting error and the minimum limiting error. The variable rate function will be described in detail in connection with FIG. 20. However, in general, the nominal or requested fuel air ratio signal passed through switch 334 is also passed through line 340 to a multiplier 342 where the selected variable rate gain is provided. The fuel air ratio error signal as compensated by the gain of block 342 is then fed as the input to FIG. 13.

Variable rate selector circuits 306 and 344 determine the gain of multiplier 342. Relay 346 determines which rate selector 306 or 344 is connected through line 350 to multiplier 342 by moving switch 348 as a function of the magnitude and direction of the nominal (requested) fuel air ratio signal on line 340. The nominal (requested) error on line 340 is multiplied by the gain factor in block 342 to reduce the rate of change of fuel flow as a function of the magnitude and rate of change of the fuel air ratio error signal. When the nominal error signal approaches a limiting error, the rate of change of the error is decreased. When the nominal error signal initiates a change away from a limiting error, the rate of change of the error is increased.

In FIG. 13 the $\Delta$ fuel air ratio error from FIG. 12 is fed into a multiplier 360. The ratio is multiplied in block 360 by a signal indicative of measured gas generator airflow ($\sqrt{P\Delta P_4}$). Thus, the error signal transmitted to the actuator through the integrator circuitry is a fuel flow signal, $W_f$.

The $W_f$ error signal is passed to block 362 denoted as integrator lockout logic which will be described in detail in connection with FIG. 19. In general, however, the integrator lockout logic 362 will prevent the integrator 364 from traveling into an over-travel position. Saturation of an integrator against a stop results when an error signal cannot be integrated to zero, resulting in the integrator continuing to travel to an extreme position. Subsequent reversal of the error signal due to an input change may result in a delay in corrective action due to the integrator being in the over-travel position. The integrator lockout logic block 362 will prevent this result.

After passing through the integrator lockout logic 362 and the integrator 364, the $\Delta W_f$ fuel error signal is passed through line 366 to limiter logic circuit 368. The function of this circuit will also be described in connection with FIG. 19, but in general computed maximum and minimum fuel flow ($W_f$) signals are fed into circuit 368 and act as fuel flow limits to prevent excessive fuel system pressure and insure adequate fuel atomization. Requesting a fuel flow beyond either limit results in the logic elements scheduling the exceeded limit and providing the system integrator with an input signal equivalent to a zero error.

After passing through logic circuit 368, the gas generator fuel flow signal $W_f$ is fed to the fuel valve actuator shown as block 110 in FIG. 5. A $W_f$ feedback signal is also provided which is used as an input to various computations in the system.

Feedback may be provided around integrator 364 as shown by the feedback path including block 370. The integrator circuit 364 and the feedback 370 may be combined to provide an anticipating feedback to the integrator. The dynamic compensation causes the error signal to approach zero rapidly. Fluidic components are preferred for the integrator 364 and the compensation network 370 in some applications.

The Duct Heater Control

FIG. 14 shows in block diagram form the duct heater fuel control shown as the basic control 52 in FIG. 2.

The duct heater control incorporates four basic functions: first, power lever rate (PLA') control; second, duct heater fuel flow ($W_{fd}$); third, nominal duct nozzle area (DNA*) schedule; and fourth, duct nozzle reset ($\Delta$Reset) during transient operations.

Control action in response to power lever angle (PLA) is coordinated through the use of a rate limiter which accepts power lever angle and passes it through a constant velocity integrator such that all power lever angle changes appear to the control loops as a fixed rate. At steady-state, power lever angle seen by the control loops is identical to the power lever angle input. Duct heater fuel flow is controlled as a function of power lever angle, duct inlet temperature ($T_{t3}$), and duct airflow ($\sqrt{P\Delta P_{3d}}$).

Duct nozzle nominal area (DNA*) is scheduled as a function of power lever angle and duct inlet temperature ($T_{t3}$).

Duct nozzle reset ($\Delta$Reset) during transients is a function of the magnitude of the requested power change. That is, for small power change requests no reset occurs, and for power change requests above a preselected value a reset is generated to request a duct nozzle reset providing increased fan surge margin.

A $\Delta$Reset signal is also transmitted to the supervisory control for use in increasing inlet system transient stability.

Referring to FIG. 14, power lever angle (PLA) and duct nozzle area (DNA) signals are fed to the power lever angle hold and rate limiter block 406. The hold function of 406 allows fuel to flow to the duct heater during the start sequence while duct nozzle area remains in the non-duct heating position. The hold is released at the anticipated time of ignition providing a smooth thrust transition from nonduct heating to duct heating. A hold function is also placed on the rate limited power lever angle (PLA') output from block 406 if DNA reaches the maximum limit. This is computed by comparing measured DNA to a known maximum. With PLA' on hold, duct heater fuel flow is limited preventing overfueling of the duct heater and possibly causing the fan to surge. PLA' is fed to the duct nozzle area transient reset block 414. PLA' is also fed to the PLA index for duct nozzle area block 411, PLA index for duct heater fuel air ratio block 401 and to the gas generator fuel control 50 of FIG. 2.

The duct heater fuel flow $W_{fd}$ is scheduled open loop as a function of power lever angle (PLA), duct airflow ($\sqrt{P\Delta P_{3d}}$) and duct inlet temperature ($T_{t3}$). $T_{t3}$ schedules the minimum and maximum fuel air ratios $W_f/\sqrt{P\Delta P_{3d}}$ in block 400.

A PLA index signal is sent from block 401 to duct heater fuel air ratio schedule block 402 where the difference between the maximum and minimum ratios is multiplied as a function of power lever angle index with the result fed to the fuel flow computer 404 where it is multiplied by duct airflow $\sqrt{P\Delta P_{3d}}$ which results in the desired fuel flow $W_{fd}$. The determination of the desired fuel flow in this manner provides maximum flexibility in this system. The maximum and minimum fuel-to-air ratio schedules, and the modulation between the two with power lever angle, are completely independent of each other.

The nominal duct nozzle area adjustment (DNA*) is scheduled as a function of power lever angle and duct inlet temperature $T_{t3}$. $T_{t3}$ schedules a maximum and minimum area in block 410 that is fed to the duct nozzle schedule function block 412. The exhaust nozzle must lead fuel flow during a duct heater acceleration and lag the fuel flow during a deceleration. This is accomplished by the duct nozzle area transient reset 414.

The duct nozzle area limit signal generated in block 410 is fed to the duct nozzle area nominal schedule in lock 412 which provides the DNA* output signal.

The duct nozzle transient reset is generated in block 414 where the change in PLA is compared to a fixed reference. For PLA change less than the reference value, no reset occurs. For PLA change greater than the reference, a PLA' is generated and supplied to the supervisory control 42 of FIG. 2 and is added to the PLA' signal fed to the PLA index for duct nozzle area 411.

The Engine Airflow Controls

FIG. 15 shows in block diagram form the engine airflow controls specifically indicated as low turbine bypass control 54, duct nozzle control 56 and gas generator nozzle control 58 of FIG. 2. The basic features of the engine airflow control are: first, matching of the inlet and engine airflow over a range of Mach numbers; second, maximizing the compressor ratio during subsonic operation; third, sensing the pressure ratio across the turbine to anticipate rotor speed changes; and fourth, providing additional fan stability margins during critical operations.

The low turbine bypass area control is utilized to control gas generator speed, thus controlling gas generator airflow. Its function is to schedule the bypass area of the turbine as a function of the turbine inlet temperature, to provide anticipatory signals as a function of a high turbine pressure ratio, and to provide a $\Delta$bypass area signal to the gas generator nozzle control.

The duct nozzle area control is used to control fan surge margin by providing a trim on fan airflow. This control schedules duct nozzle position as a function of power lever angle and fan discharge temperature.

The gas generator nozzle area control is utilized to control low rotor speed, ths providing control of total engine airflow. It schedules nozzle position as a function of engine inlet temperature and tubine inlet temperature, and provides anticipatory signals as a function of low rotor speed and $\Delta$low turbine bypass area.

Referring now to FIG. 15, the gas generator nozzle area computer, block 420, receives inputs indicative of engine airflow, requested engine airflow as a function of local Mach number, inlet bypass door position and actual fan speed, and from this information a gas generator nozzle area request signal is produced which is fed to gas generator nozzle area actuator 422. Two different biases are applied to the gas generator nozzle area computer 420, the first being as a function of the high turbine inlet temperature and the fan inlet temperature, both of which are fed to area bias block 424 and then computer 420. A second gas generator nozzle area bias is produced in block 426 as a function of the low turbine bypass area request signal, this bias also being fed to the gas generator computer 420. The latter signal is indicative of impeding speed changes as a result of changes in the low turbine bypass area.

The low turbine bypass area signal (LTBA) is generated in low turbine bypass area computer 428 as a function of compressor speed and turbine pressure ratio, biased by the high turbine inlet and fan inlet temperature signals produced in block 424. The low turbine computer 428 produces the low turbine bypass area request signal which is fed to gas generator nozzle area bias 426 and also to the low turbine bypass area actuator 430.

The duct nozzle area control signal (DNA) is independent of the other engine airflow control loops. The duct airflow computer 432 produces a duct airflow request signal as a function of fan surge limit and duct airflow. The duct airflow request signal is fed from the duct airflow computer 432 to the duct nozzle area computer 434 together with a duct nozzle area adjustment signal (DNA*) produced as shown in FIG. 14. The duct nozzle area computer 434 feeds the duct nozzle area actuator 436 to produce the duct nozzle area control signal.

Figure 16:
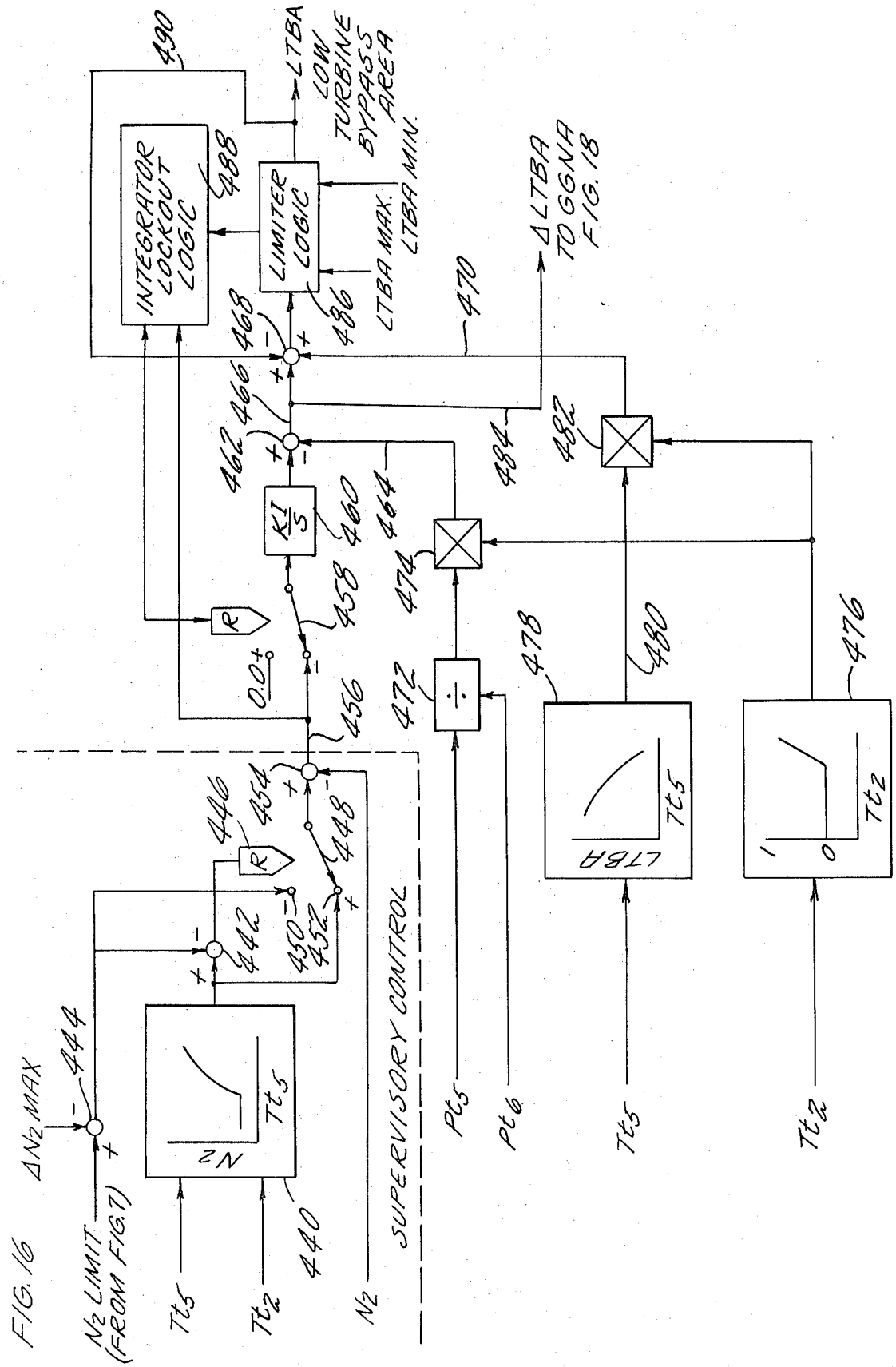
FIGS. 16 through 18 show partially in schematic form and partially in block diagram form specific details of the engine airflow control of FIG. 15.
Figure 17:
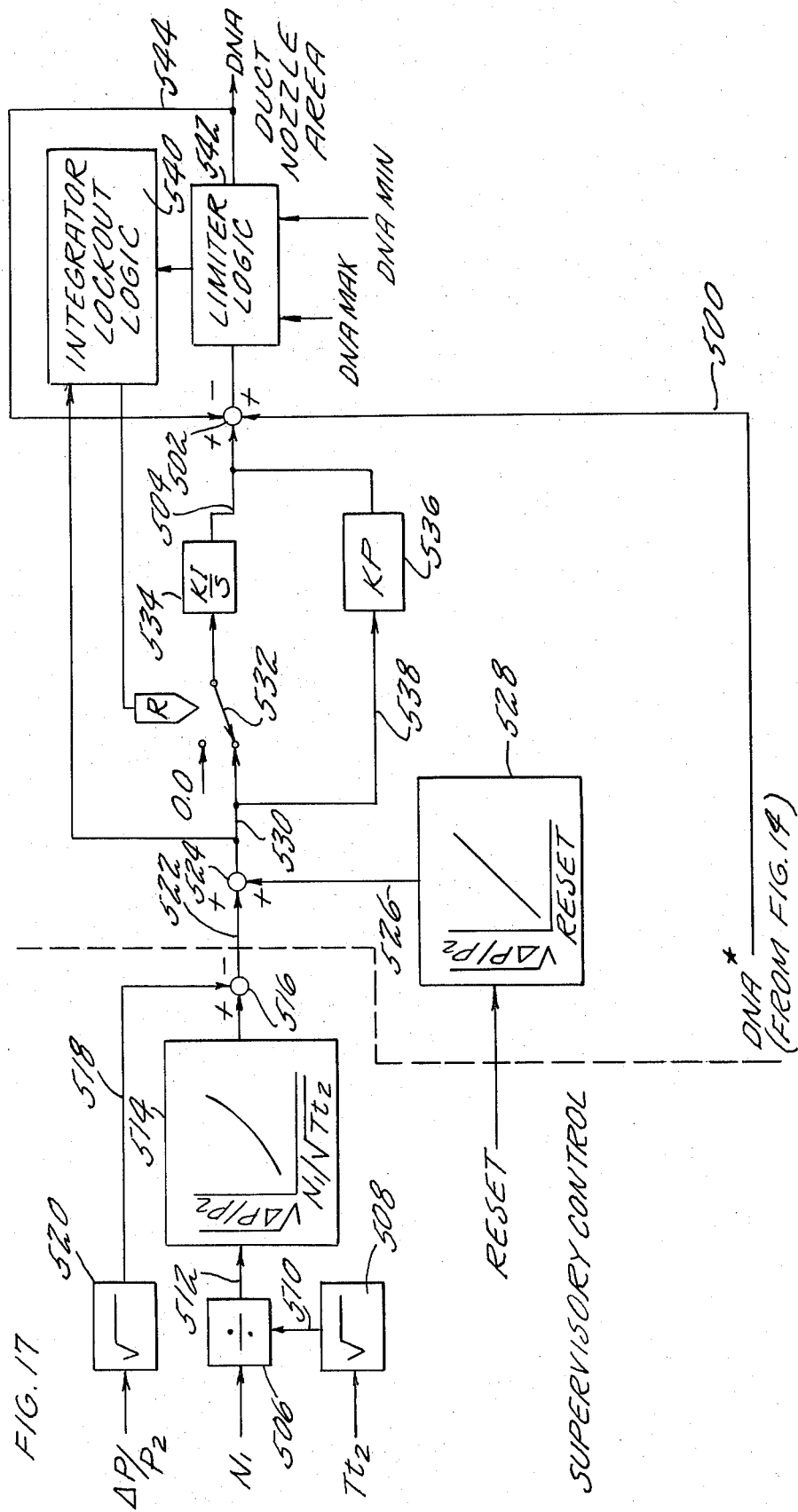
Figure 18:
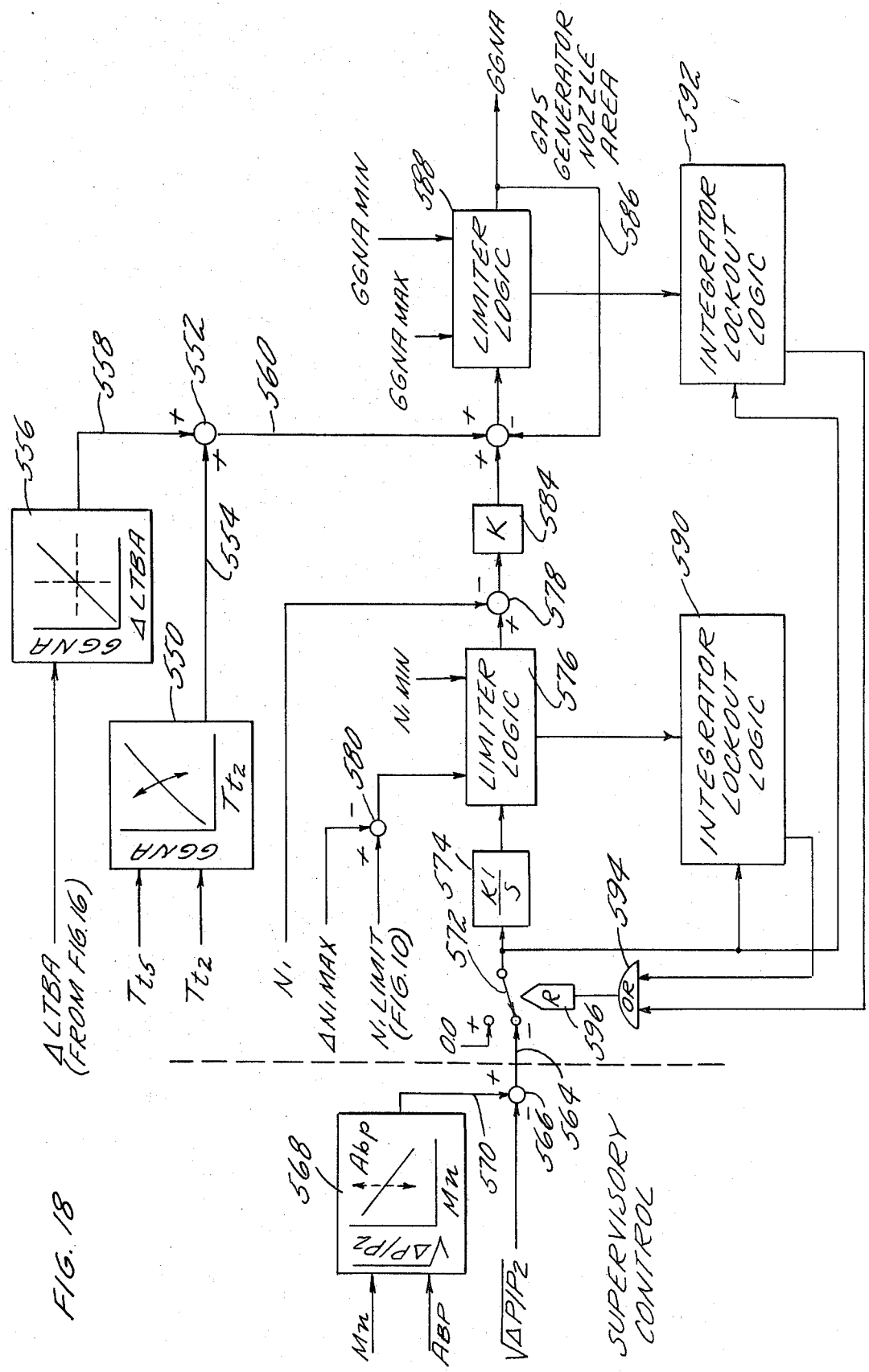

FIGS. 16, 17 and 18 show the specific details of the computations performed by the blocks shown in FIG. 15. In FIG. 16, the low turbine bypass area (LTBA) signal generation is shown. Transient errors in a control may be minimized if the control has knowledge of future engine action. The low turbine bypass area control discloses a general technique which provides control lead through the use of nonscheduling parameters, i.e., parameters not directly related with the parameter being controlled. For example, steady-state turbine speed is a function of turbine pressure ratio. Any transient change in turbine pressure ratio is an indication of a future speed change. This advanced information or lead may be a control signal to fuel flow, area, or some other variable to take corrective control action. The desired speed is equivalent to speed, and the fictitious pressure ratio request is equivalent to turbine pressure ratio for steady-state operation. However, if turbine pressure ratio changes, a signal is fed to the area control indicating an impending speed change, and the desired action may be taken by the control to minimize the speed error.

The Low Turbine Bypass Control

The general control concept described above is illustrated in FIG. 16. A compressor or high rotor ($N_2$) error signal is generated in the supervisory control 42 of FIG. 2, shown in detail in FIG. 16. Turbine inlet temperature $T_{t5}$ and fan inlet temperature $T_{t2}$ are fed into function generator 440. This function generator is bivariant, and the curve is shown as a function of $T_{t5}$, but it should be understood that the curve is shifted as a function of $T_{t2}$. The output from function generator 440 is a scheduled $N_2$ speed, and is fed to junction 442. This signal permits the $N_2$ speed to be maintained at or near the limiting value during operation at high power conditions. Gas generator airflow will be maximized by running at limiting speeds. The scheduled speed signal at junction 42 is compared to an $N_2$ limit signal that is generated as shown in FIG. 7 as a function of turbine cooling airflow, compressor discharge temperature, turbine inlet temperature and a constant. The three sensed parameters generate the variable $N_2$ limit that is used as a topping control, implemented through fuel flow. The $N_2$ limit signal is fed to a junction 444 where a constant $\Delta N_2$ is subtracted from this variable limit to generate an $N_2$ limit implemented by low turbine bypass area. The $N_2$ limit as modified is then fed from junction 444 into junction 442 where comparison of the scheduled $N_2$ speed and the limiting $N_2$ speed results in the lower of the two being selected by relay 446 and switch 448 as the desired $N_2$ speed. The use of a $\Delta N_2$ between the two $N_2$ limits insures that two variables do not simultaneously control one engine parameter.

Relay 446 is connected with junction 442, and receives a signal therefrom, which depends on the lower of the two signals at junction 442. Relay 446 actuates switch 448 accordingly, choosing the signal at terminals 450 or 452, whichever is lower.

The selected $N_2$ speed signal is fed through switch 448 to junction 454 where it is compared to actual $N_2$ speed. The resulting speed error signal is then fed to the low turbine bypass area control proper via line 456. The error signal passes through a switch 458 and through integrator 460 to junction 462. The function of switch 458 and its associated relay will be described in connection with the integrator lockout logic control shown in detail in FIG. 19. The integrated speed signal fed from the integrator to junction 462 is a fictitious pressure ratio request signal. Also fed to junction 462 is a high turbine pressure ratio signal which appears on line 464. A change in pressure ratio across the high rotor turbine results in a change in turbine speed. Sensing a change in pressure ratio and comparing it to the desired ratio provides a lead signal, indicating that a speed change will follow. Such a lead signal is utilized as shown by having the output from the integrator 460, a desired turbine pressure ratio signal, compared to the actual pressure ratio at junction 462. The pressure ratio error generated at junction 462 is fed through line 466 to junction 468 where it acts as a bias to the basic area schedule fed to junction 468 via line 470. The signal appearing on line 470 is the main control signal, low turbine bypass area request.

The actual turbine pressure ratio is computed in block 472 where the ratio of turbine inlet pressure signal $P_{t5}$ to turbine outlet pressure signal $P_{t6}$ is computed. The output from circuit 472 is fed to a multiplier circuit 474. The gain of the multiplier 474 is scheduled in function generator 476 as a function of fan inlet temperature $T_{t2}$. It may be noted from block 476 that the multiplier applied to block 474 and scheduled as a function of $T_{t2}$ is zero at low values of $T_{t2}$, and rises linearly to 1 at high values of $T_{t2}$. Consequently, at low values of $T_{t2}$, for example below Mach 2.2, the multiplier factor is zero, and block 474 will feed a zero signal through line 464 to junction 462.

The basic control signal is scheduled in block 478 as a function of turbine inlet temperature $T_{t5}$, where the scheduled low turbine bypass area signal is generated and fed through line 480 to multiplier 482. Multiplier 482 is also scheduled by the output from block 476, and multiplier 482 operates in a manner similar to multiplier 474, that is, multiplication by zero and a zero low turbine bypass area request signal being fed to junction 468 via line 470 at low Mach numbers. Consequently, at low fan inlet temperatures (low Mach numbers) both the actual pressure ratio signal on line 464 and the low turbine bypass area request signal on line 470 are zero. At high Mach numbers, above about 2.2, the low turbine bypass area signal generated in function generator 478 acts as the basic control signal, and is biased by the difference between the integrated speed error (fictitious pressure ratio request) signal and the actual turbine pressure ratio signals which appear at junction 462.

The trim signal appearing on line 466 is required to maintain the scheduled speed at low Mach numbers. This signal is also fed via line 484 to a gas generator nozzle area control in FIG. 18 as a ΔLTBA signal.

The signal which appears at junction 468 as a result of the low turbine bypass area request signal on line 470 and the trim signal on line 466 is fed to the limiter logic block 486 where it is compared to fixed maximum and minimum low turbine bypass area limits. Requesting an area beyond either limit results in the logic elements scheduling the exceeded limit and providing the system integrator with an input signal equivalent to a zero error. Logic limiter circuit 486 operates in conjunction with integrator lockout logic control 488 and switch 458 as will be described in FIG. 19.

The output from the limiter logic circuit 486 is the low turbine bypass area control signal produced by the basic control block 54 in FIG. 2. Negative feedback is provided by feeding the actual LTBA signal via line 490 to junction 468.

The low turbine bypass area control of FIG. 16 illustrates how nonscheduling parameters minimize transient errors. The turbine pressure ratio signal on line 464 is used to anticipate changes in low turbine bypass area. During steady-state operation, the high speed turbine request signal passing through switch 448 is equal to the actual $N_2$ speed. The output from the speed integrator 460 is equivalent to a high turbine pressure ratio on line 464. The low turbine bypass area is then equivalent to the desired value appearing on line 470, plus the trim appearing on line 466 which is required to maintain the scheduled speed. If for any reason a change in high turbine pressure ratio on line 464 occurs, an immediate signal is sent to the low turbine bypass area in the engine in anticipation of a change in $N_2$ speed. The resulting area change minimizes transient errors in speed. This technique may be applied to many processes in which a change in one parameter indicates an impending change in another.

The Duct Nozzle Control

FIG. 17 shows in detail the computation of the duct exhaust nozzle control signal shown as block 56 in FIG. 2.

The basic duct exhaust nozzle position is scheduled by the DNA* signal generated as shown in FIG. 14 as a function of power lever angle and fan inlet temperature. The DNA* signal is fed via line 500 to junction 502. The basic schedule is accomplished in this manner to provide the necessary correlations between nozzle area and duct heater fuel flow during duct heater transients. The basic schedule appearing on line 500 is biased by the signal on line 504 in order to maintain the desired fan surge margin.

Fan speed $N_1$ and inlet air temperature $T_{t2}$ are fed to blocks 506 and 508 respectively. In block 508 the square root function of $T_{t2}$ is computed, and this function is fed into block 506 via line 510 where it is divided into the $N_1$ signal. The resultant ratio signal is fed from block 506 via line 512 to function generator 514 to schedule fan airflow, $\sqrt{\Delta P/P_2}$. The output from function generator 514 is fed to junction 516 where it is compared with fan airflow $\sqrt{\Delta P/P_2}$ fed to junction 516 via line 518. The measured pressure ratio $\Delta P/P_2$ is fed into block 520 which takes the square root of the pressure ratio signal and provides the fan airflow signal on line 518. At junction 516 the scheduled fan airflow signal from function generator 514 is compared with the fan airflow signal on line 518 to provide a fan inlet airflow error signal which appears on line 522. The generation of the fan inlet airflow error signal takes place in the supervisory control, block 42 of FIG. 2.

The error signal on line 522 is fed to junction 524. A reset is also added to the error schedule at junction 524 via line 526 as necessary to provide additional margin during duct heater transients or when indicated by an airframe generated signal. The reset function is produced in block 528 and acts to increase the fan airflow signal at junction 524. The reset function is a safety factor which is utilized to prevent surge, but which also will slightly lower performance.

The combined fan airflow error signal from line 522 and the reset signal from line 526 are combined at junction 524 to produce a trim signal on line 530 which is fed through switch 532 and through integrator 534 to line 504 and junction 502. In addition to the integral function, a proportional function is utilized as shown in block 536 via line 538. The switch 532 and its associated relay are connected with the integrator lockout logic 540 which will be described in connection with FIG. 19.

The resulting bias signal on line 504 is added at junction 502 to the basic exhaust nozzle schedule DNA* from line 500. The output from this circuit is then fed through limiter logic block 542 to provide the duct nozzle area signal as shown in FIG. 2. Exhaust nozzle area is also compared with the desired and bias signals by way of feedback to junction 502 via line 544. The resulting nozzle area signal is compared to fixed maximum and minimum exhaust nozzle limits in limiter logic circuit 542. Requesting an area beyond either limit results in the logic elements scheduling the exceeded limit and providing the integrator with a signal equivalent to zero as shown in FIG. 19.

The advantage of the control mode shown in FIG. 17 is that fan performance is controlled, thereby producing maximum component efficiency. Previous fan control methods manipulated the fan to achieve an engine desired output of airflow without regard to fan component performance.

The Gas Generator Nozzle Control

The control system for the gas generator exhaust nozzle (GGNA) shown in detail in FIG. 18 is similar to the system for the low turbine bypass area of FIG. 16. The gas generator nozzle area control is shown as block 58 in FIG. 2.

The basic gas generator exhaust nozzle area is scheduled as a function of fan inlet temperature $T_{t2}$. As shown in FIG. 18, a $T_{t2}$ signal is fed to function generator 550 together with a turbine inlet temperature signal $T_{t5}$. Function generator 550 is a bivariant curve. The gas generator nozzle area signal produced in function generator block 550 is fed to junction 552 via line 554. A $\Delta$bias is applied to the basic exhaust nozzle area schedule at junction 552 as a function of low turbine bypass area. The $\Delta$LTBA signal produced as shown in FIG. 16 is fed to function generator 556 to produce the bias which is fed to junction 552 via line 558. The bias insures that the two basic schedules remain coordinated and is another application of the use of non-scheduling parameters to minimize transient errors. The combined signals are then fed from junction 552 via line 560 to junction 562.

An engine total airflow error signal is generated in the supervisory control, block 42 of FIG. 2, and fed to the gas generator nozzle area control on line 564. Actual engine airflow is sensed in the form of a $\sqrt{\Delta P/P_2}$ signal at the inlet to the fan, and is fed to junction 566. Desired airflow is scheduled in block 568 as a function of Mach number ($M_n$) and inlet bypass door position ($A_{BP}$). The desired total airflow signal is fed from block 568, a bivariant function generator, via line 570 to junction 566. The difference between the two airflow values is the airflow error signal which appears at line 564.

Figure 19:
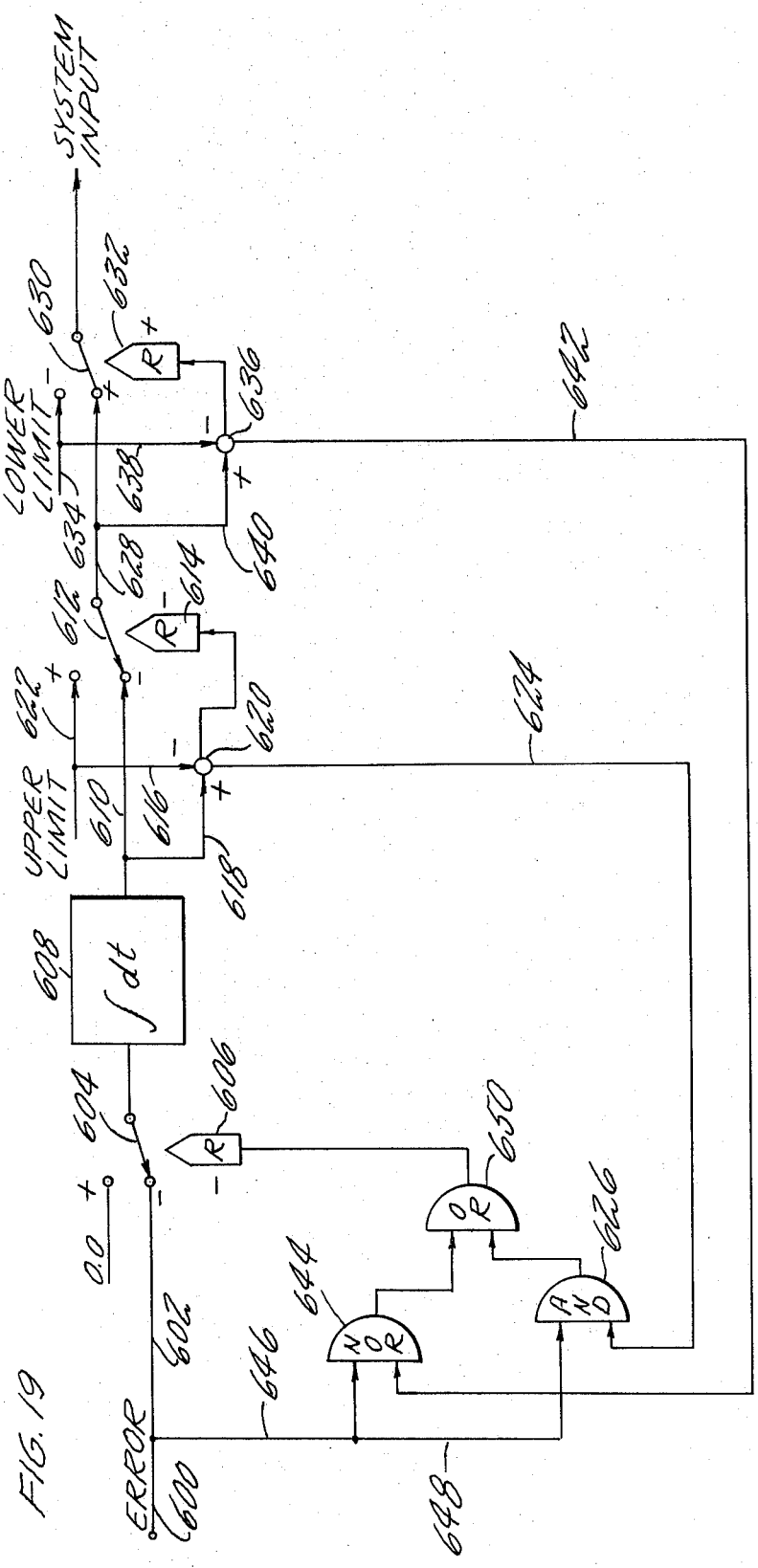
FIG. 19 shows schematically the details of the integrator lockout control.

The airflow error signal is fed through switch 572 which is a portion of the integrator lockout logic of FIG. 19, to integrator 574 and through limiter logic block 576 to junction 578. The output from integrator 574 is a desired low rotor speed that is compared in the limiter circuit 576 to minimum and maximum rotor speed to insure that neither is exceeded. The maximum $N_1$ speed is produced at junction 580 by biasing the $N_1$ limit signal from FIG. 10 with a $\Delta N_1$ signal. Exceeding either limit results in the logic elements scheduling the exceeded limit and providing the integrator with a signal equivalent to zero error.

The low rotor speed signal is compared at junction 578 to actual low rotor speed $N_1$ produced on line 582, with the difference being fed through gain block 584 to junction 562 where it provides desired gas generator nozzle area bias signal. This scheduled area is added to the open loop schedule, a function of $T_{t2}$ and LTBA appearing on line 560, and is compared to actual gas generator nozzle area fed back to junction 562 via line 586.

The resultant area schedule from junction 562 is fed to limiter logic block 588 where it is compared to fixed maximum and minimum area limits. Requesting an area beyond either limit results in the logic elements scheduling the exceeded limit and providing the system integrator with an input equivalent to zero error.

The logic of FIG. 18 is slightly different than that of the other control loops in that both limiter logic blocks 576 and 588 are fed to separate integrator lockout logic blocks 590 and 592. Both logic blocks are connected to an OR gate 594, and the appearance of a signal at gate 594 from either of the logic circuits 590 or 592 will cause relay 596 to actuate switch 572 and schedule a zero error.

Integrator Lockout Logic

FIG. 19 shows in detail the integrator lockout logic and limiter logic shown as blocks in FIGS. 13, 16, 17 and 18.

Previous controls allow the control to become lost relative to the control system when the system reaches a limit. The control technique shown in FIG. 19 provides a method of regaining the control action required in advanced propulsion systems as described herein.

Saturation of an integrator against a stop results when an error signal cannot be integrated to zero. Even though the controlled device has reached a limit, as long as an error signal is present the integrator will continue to integrate the input error signal, and the integrator will continue to travel to an extreme position. Subsequent reversal of the error signal due to an input change may result in a delay in corrective action if the integrator is in an over-travel position from the previous error signal. The integrator lockout logic of FIG. 19 will prevent an integrator from traveling into an over-travel position. The theory of the logic is that the output from the integrator will be compared with upper and lower limit signals indicative of integrator outputs above or below which the integrator cannot travel without saturating the system. If the output from the integrator exceeds either the upper or lower limit, a relay is operated which will switch the integrator input to zero and prevent further saturation of the integrator.

Referring to FIG. 19, the input signal to the integrator, denoted as the error signal, is fed through lines 600 and 602 to switch 604. The switch is normally held in the negative position as shown by virtue of a negative signal on relay 606. The error signal passes through switch 604 and integrator 608. The output from the integrator passes through switch 604 and integrator 608. The output from the integrator passes through line 610 and switch 612 which is also normally held in its negative position by virtue of the negative signal on a relay 614.

A signal indicative of the upper limit of the output from the integrator before saturation is reached is fed to the positive terminal of switch 612 via line 622. This same signal is also fed via line 616 to junction 620. The output signal from the integrator is fed via line 618 to junction 620 where it is compared with the upper limit signal. During normal operation, that is, when the integrator has not been saturated, the upper limit signal appearing on line 616 will be greater than the output signal from the integrator appearing on line 618. By virtue of the sign convention shown at junction 620, the relay 614 will take the sign of the greater signal, in this case, the upper limit signal, and the relay 614 will be negative and the switch 612 will contact the negative terminal. A negative sign will be transmitted via line 624 to AND gate 626.

After passing through switch 612, the integrator output signal will pass through line 628 to switch 630 which is normally held in its positive position by virtue of the positive sign on relay 632. A signal indicative of the lower limit of the integrator output prior to saturation is fed to the negative terminal of switch 630 via line 634, and is also fed to junction 636 via line 638. The integrator output signal appearing on line 628 is also fed to junction 636 via line 640. The two signals are compared at junction 630 with the sign convention as shown. Normally, the signal appearing on line 640 will be greater than the lower limit signal appearing on line 638, and the sign of the positive signal will be fed to relay 632, maintaining switch 630 at the positive terminal. The positive sign at junction 636 will also be fed via line 642 to NOR gate 644.

With the switches 604, 612 and 630 in the positions as shown in FIG. 19, the integrator is not saturated and the output signal from the integrator will pass through the system without any changes.

The original error signal appearing on line 600 is also fed via line 646 as another input to NOR gate 644, and via line 648 as an input to AND gate 626. The outputs from the AND gate 626 and the NOR gate 644 are fed as inputs to OR gate 650 which controls the sign on relay 606. During normal operation, the sign on the OR gate 650 will be negative and relay 606 will be negative, maintaining switch 604 in its negative position. This can be seen from the fact that during normal operation the sign on line 624 is negative, and the output from the output AND gate 626 will always be negative regardless of the signal on line 648 (refer to logic diagrams, FIG. 19). Likewise, the sign on line 642 will normally be positive, and the output from NOR gate 644 will always be negative regardless of the signal on line 646. Since both AND gate 626 and NOR gate 644 produce negative outputs, OR gate 650 will produce a negative output.

Assume, however, that the error signal on line 600 is positive, and that the integrator 608 is saturated in a positive direction, that is, above the upper limit. In this case, the signal appearing on line 618 will be greater than the upper limit signal on line 616, and relay 614 will then receive a positive sign. Switch 612 will then move to the positive terminal and the upper limit signal will be fed from line 622 through switch 612. At the same time, line 624 will now receive a positive sign, which is transmitted as one input to AND gate 626. The positive error signal on line 648 will also be an input to AND gate 626. With two positive inputs, the output from AND gate 626 will be positive, and its input to the OR gate 650 will also be positive. A positive sign on either input to the OR gate 650 will cause its output to be positive. Now, relay 606 has a positive sign on it, and switch 604 will move to the positive terminal and provide a zero input to integrator 608. This will prevent further saturation of the integrator. The output from the circuit of FIG. 19 will be the upper limit signal on line 622 which passes through line 612 and switch 630. Since the upper limit has been exceeded, no change will occur with the lower limit switch 630.

The same analysis may be made with respect to this circuit if the output from the integrator exceeds the lower limit, and the input error on line 600 is negative. In this case, both inputs to the NOR gate 644 will be negative, resulting in a positive output signal fed to OR gate 650, and again a positive sign on relay 606 to cause a zero input to the integrator. The lower limit signal will then be passed through switch 630.

The circuit of FIG. 19 is not limited to the turbo-propulsion system as described herein, but may be used with any system in which saturation of an integrator will occur.

Variable Rate Control

Figure 20:
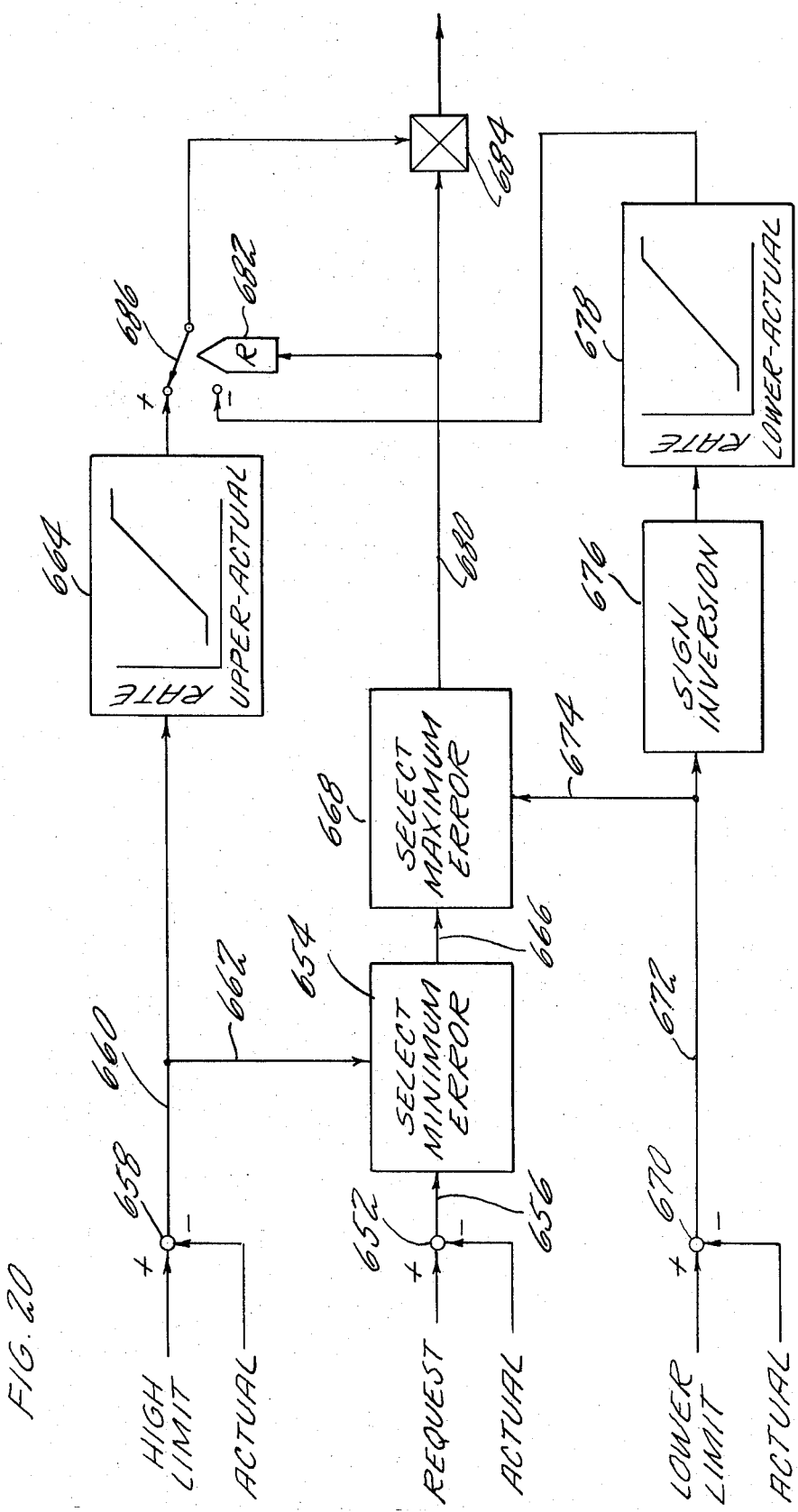
FIG. 20 shows schematically the variable rate control shown in block diagram form in FIG. 12.

FIG. 20 shows in detail the variable rate control circuit originally described with relation to FIG. 12. FIG. 20 shows the control more clearly as it may be applied to the control of any variable, whereas in FIG. 12 the description was restricted to a fuel control system.

The variable rate compensation allows for high control compensation when system operation is relatively safe and moving into a region of safety. Control compensation is reduced as the system moves toward an unsafe region or approaches a limit. The variable rate control provides improved transient response and a more versatile control mode, and is adaptable to any system operating between limits.

The control measures the difference between the requested value of the control variable and the actual value of the control variable to determine in which direction movement of the variable is required. In addition, the actual value of the variable is compared with both high and low limits to determine how close the variable is to these limits. The rate of compensation applied to the error signal, i.e., the difference between the actual and requested values of the variable, is determined by how close the error signal is to one of the limits. Gain is high when near an upper limit and a request for down-trim is made, or when near a lower limit and a request for up-trim is made. Gain is low when near an upper limit and a request for up-trim is made, or when near a lower limit and a request for down-trim is made. For operation near nominal, gain is nominal.

Referring now to FIG. 20, the inputs to the control are a high limit, a requested signal, an actual signal and a lower limit. For purposes of illustration, it will be assumed that the high limit is +20, the lower limit is −20, the requested value of the variable is +10, and the actual value of the variable is +5. The requested value +10 is compared with the actual value +5 at junction 652 and the error signal, +5, is fed to minimum error selector circuit 654 via line 656.

The high limit signal +20 is compared with the actual value +5 at junction 656, and the high limit error signal of +15 is fed via lines 660 and 662 into minimum error selector 654. The high limit error signal is also fed to variable rate selector 664.

The minimum error selector 654 selects the signal calling for the minimum error. In this case the errors are +15 on line 662 and +5 on line 656. The +5 error is selected and passed via line 666 to maintain error selector 668.

The lower limit signal, −20 is compared with the actual signal, +5, at junction 670. The error signal, −25, is then fed via lines 672 and 674 to the maximum error selector 668. The lower limit error signal, −25, is also fed through the sign inversion block 676 where it is converted to an error of +25, and then into variable rate selector 678.

Maximum error selector 668 selects the more positive error signal, in this case the +5 appearing on line 666 as opposed to the −25 appearing on line 674, and passes the +5 signal via line 670 to both the relay 682 and the multiplier 684. The relay 682 will take the sign of the error signal on line 680, in this case positive, and will cause switch 686 to contact the positive terminal.

The rate of compensation is shown by the curve in block 664, and is determined by the magnitude of the high limit error signal fed into block 664 via line 660. In this case the high limit error signal is +15, and the rate of compensation applied to multiplier or gain block 684 from variable rate selector 664 via line 686 will be approximately near the middle of the curve shown in block 664, or at about half the maximum rate of compensation.

If the requested value of the variable is +5 and the actual value +10, the error passed to relay 682 via line 680 would be negative, and relay 682 would have a negative sign, switching switch 686 to the negative terminal, and the rate of compensation would be indicated by variable rate selector 678. This would indicate that the actual value was too high, and it would be moving toward the lower limit. Since the lower limit would be a greater distance away, the compensation provided by block 678 through switch 686 to multiplier 684 would be at a greater rate. Therefore, the rate of compensation applied to the error signal on line 680 by multiplier 684 is dependent upon both the direction that the control variable is moving, and its distance from the limit toward which it is heading.

Ejector Controls

The exhaust nozzle-ejector operates to combine all turbopropulsion system airflows and eject the air with overall increased thrust as compared to a nonejected system. The exhaust/ejector system depicted in the embodiment consists of two variable geometries and a mixing volume. The variable geometries are ejector flaps and blow-in-doors, both of which are aerodynamically actuated by the pressure delta across each. While the present embodiment serves the needs of this specific application, other turbopropulsion systems may benefit from exhaust/ejectors utilizing a basic control to achieve a desired expansion ratio and a supervisory control loop to integrate exhaust/ejector control with the other airflow control loops.

While the present invention has been described in terms of its preferred embodiment, it will be apparent to those skilled in the art that changes and modifications may be made to the details and arrangement of parts without departing from the scope of the invention as hereinafter claimed.

We claim:

1. A fuel control for a twin spool turbine engine having a high turbine for driving a high compressor and a low turbine for driving a low compressor, and including a burner for providing power for said high and low turbines comprising
    means responsive to selected parameters in said engine for generating a plurality of signals each of which is indicative of a fuel flow limit for said engine,
    at least limit selector receiving each of said fuel flow limits signals and passing therethrough the fuel flow limit signal calling for the lowest fuel flow,
    means for generating a fuel flow error signal indicative of the difference between a desired fuel flow and actual fuel flow,
    a minimum error selector receiving the fuel flow limit signal passed by said least limit selector and receiving said fuel flow error signal and passing therethrough the signal calling for the lower fuel flow,
    means for generating a signal indicative of a minimum fuel flow limit for said engine,
    a maximum error selector receiving said lower fuel flow signal and said minimum fuel flow limit signal and passing therethrough the signal calling for the maximum fuel flow,
    a variable gain circuit for varying the gain of the maximum fuel flow signal passed by said maximum error selector,
    means responsive to the fuel flow limit signal passed by said least limit selector and to the minimum fuel flow limit signal for scheduling the gain of said variable gain circuit,
    and means responsive to said maximum fuel flow signal as compensated by said variable gain circuit for controlling the flow of fuel to said combustor.

2. A fuel control as in claim 1 in which said means responsive to selected parameters in said engine for generating a plurality of signals indicative of a fuel flow limit for said engine comprises
    means for generating a signal indicative of engine high compressor speed limit,
    means for generating a signal indicative of low compressor speed limit,
    means for generating a signal indicative of high turbine inlet temperature limit,
    means for generating a signal indicative of burner pressure limit,
    and means for generating a signal indicative of compressor surge limit.

3. A fuel control as in claim 1 in which said means for scheduling the gain of said variable gain circuit includes
    means responsive to said fuel flow limit signal for scheduling a first gain factor,
    means responsive to said minimum fuel flow limit signal for scheduling a second gain factor,
    means responsive to the magnitude and polarity of said maximum fuel flow signal for selecting one of said first or second gain factors,
    and means for scheduling the gain of said variable gain circuit in response to said selected gain factor.

4. A fuel control as in claim 1 in which said means for generating a fuel flow error signal comprises
    a variable power lever connected with said turbine engine,
    means for generating a first signal in response to the position of said power lever, means for generating a second signal in response to the temperature at the engine compressor inlet, means responsive to said first and second signals for generating a scheduled fuel flow signal, means responsive to said first and second signals for generating a scheduled high compressor speed signal, means for measuring high compressor speed and generating a measured high compressor speed signal, means comparing said scheduled high compressor speed signal with said measured high compressor speed signal to generate a high compressor speed error signal, means responsive to said measured high compressor speed signal for generating a governor slope signal, means multiplying said high compressor speed error signal by said governor slope signal to produce a governor slope bias signal, means for adding said governor slope bias signal to said scheduled fuel flow signal to produce a fuel flow request signal, means for measuring actual fuel flow and generating a signal in response thereto, and means for comparing said measured actual fuel flow signal with said fuel flow request signal to generate said fuel flow error signal.

5. A fuel control as in claim 1 in which said means for generating a minimum fuel flow limit signal comprises means responsive to burner pressure and to compressor discharge temperature for generating a desired minimum fuel flow signal, means for measuring actual fuel flow and generating a signal in response thereto, and means comparing said measured fuel flow signal with said desired minimum fuel flow signal to generate said minimum fuel flow limit signal.

6. A fuel control as in claim 1 and including means responsive to the temperature rise across said burner for generating a signal indicative of the occurrence of a flameout in said engine.

and means for disconnecting said maximum fuel flow signal and scheduling a fixed fuel flow signal to said engine when a flameout signal is present.

7. A fuel control as in claim 2 in which said means for generating a compressor surge limit signal comprises means responsive to the temperature at the inlet to said compressor and to the speed of said high compressor for generating a signal indicative of desired compressor discharge airflow, means for measuring compressor discharge airflow and generating a signal indicative thereof, and means for comparing said desired and measured signals to generate a compressor surge limit signal.

8. A control as in claim 7 and including means for generating a reset signal, and means for varying said desired compressor discharge airflow signal in response to said reset signal to provide additional surge margin under selected operating conditions of said engine.

9. A fuel control as in claim 2 in which said means for generating a high compressor speed limit signal comprises means responsive to the temperature at the discharge of said high compressor and to the temperature at the inlet to said high turbine for generating a signal indicative of a desired high compressor speed limit, means for measuring high compressor speed and generating a signal indicative thereof, and means for comparing said desired high compressor speed limit signal with said measured high compressor speed signal to generate a high compressor speed limit signal.

10. A control as in claim 9 in which said engine includes a variable bypass around the turbine, a control for said bypass, and means for feeding said high compressor speed limit signal to said bypass control to vary the bypass area.

11. A control as in claim 9 in which said turbine engine includes a source of cooling air for said turbine, and means responsive to the cooling airflow for varying said desired high compressor speed limit signal.

12. A fuel control as in claim 1 in which said engine has a source of cooling air for the turbines, and in which said means for generating a high turbine inlet temperature limit signal comprises means responsive to the rate of turbine cooling airflow and the temperature of the turbine cooling airflow for generating a desired high turbine inlet temperature limit signal, means for measuring the high turbine inlet temperature and generating a signal in response thereto, and means for comparing said measured high turbine inlet temperature signal with said high turbine inlet temperature limit signal to produce said high turbine inlet temperature limit signal.

13. A control as in claim 12 in which said engine has a variable power lever connected therewith for scheduling engine operation, and means responsive to the position of said power lever for varying said desired high turbine inlet temperature limit signal.

14. A fuel control as in claim 1 in which said means for generating a burner pressure limit signal comprises means responsive to the temperature at the discharge from said high compressor for generating an allowable burner pressure signal, means for measuring the pressure in said burner and generating an actual burner pressure signal, and means comparing said actual burner pressure signal with said allowable burner pressure signal to produce said burner pressure limit signal.

15. A control as in claim 14 and including a duct surrounding the burner, means for measuring the pressure in said duct and generating a duct pressure signal, and means for varying said burner pressure limit signal in response to said duct pressure signal.

* * * * *

UNITED STATES PATENT OFFICE
CERTIFICATE OF CORRECTION

Patent No. 3,797,233      Dated March 19, 1974

Inventor(s) W. L. Webb, T. R. Warwick, R. D. Hackney, R. L. Price

It is certified that error appears in the above-identified patent and that said Letters Patent are hereby corrected as shown below:

Claim 1, column 28, line 8, "at" should be --a--

Signed and sealed this 30th day of July 1974.

(SEAL)
Attest:

McCOY M. GIBSON, JR.
Attesting Officer

C. MARSHALL DANN
Commissioner of Patents